United States Patent
Nguyen et al.

(10) Patent No.: US 12,405,661 B2
(45) Date of Patent: Sep. 2, 2025

(54) DEVICES AND METHODS FOR CONTROLLING ELECTRONIC DEVICES OR SYSTEMS WITH PHYSICAL OBJECTS

(71) Applicant: Apple Inc., Cupertino, CA (US)

(72) Inventors: Shem Nguyen, Oakland, CA (US); Soravis Prakkamakul, Emeryville, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/151,206

(22) Filed: Jan. 6, 2023

(65) Prior Publication Data

US 2023/0221799 A1 Jul. 13, 2023

Related U.S. Application Data

(60) Provisional application No. 63/266,626, filed on Jan. 10, 2022.

(51) Int. Cl.
*G06F 3/01* (2006.01)
*G06F 3/04842* (2022.01)
*G10H 1/00* (2006.01)

(52) U.S. Cl.
CPC .............. *G06F 3/013* (2013.01); *G06F 3/017* (2013.01); *G10H 1/0008* (2013.01); *G06F 3/04842* (2013.01); *G10H 2210/375* (2013.01); *G10H 2220/455* (2013.01)

(58) Field of Classification Search
CPC ...... G06F 3/013; G06F 3/017; G06F 3/04842; G10H 1/0008; G10H 2220/355; G10H 2210/375
See application file for complete search history.

(56) References Cited

U.S. PATENT DOCUMENTS

| | | | | |
|---|---|---|---|---|
| 10,186,086 B2* | 1/2019 | Giraldi | ................... | G06F 3/013 |
| 11,635,808 B2* | 4/2023 | Nagar | ................. | G06F 3/04815 |
| | | | | 345/156 |
| 2013/0257751 A1* | 10/2013 | Stafford | ................. | G06F 3/011 |
| | | | | 345/173 |
| 2013/0321271 A1* | 12/2013 | Bychkov | ................. | G06F 3/017 |
| | | | | 345/158 |

(Continued)

OTHER PUBLICATIONS

Polap et al., "Obstacle Detection as a Safety Alert in Augmented Reality Models by the Use of Deep Learning Techniques," Sensors, vol. 17, No. 2803, Dec. 4, 2017, 16 pages.

(Continued)

*Primary Examiner* — Doon Y Chow
(74) *Attorney, Agent, or Firm* — Kubota & Basol LLP

(57) ABSTRACT

Some examples described in this disclosure are performed at a first electronic device (e.g., a computer system) that is in communication with a display and one or more input devices. In some examples, the first electronic device detects a change in a physical environment of the first electronic device due to movement of one or more physical objects in the physical environment indicative of a user input. In some examples, the first electronic device performs a first action at the first electronic device or at a second electronic device in communication with the first electronic device in accordance with the change in the physical environment due to movement of the one or more physical objects in the physical environment.

10 Claims, 17 Drawing Sheets

(56) References Cited

U.S. PATENT DOCUMENTS

| | | | | |
|---|---|---|---|---|
| 2014/0361988 A1* | 12/2014 | Katz | ......................... | G06T 7/70 |
| | | | | 345/156 |
| 2015/0309629 A1* | 10/2015 | Amariutei | ............... | G06F 3/017 |
| | | | | 345/173 |
| 2017/0192493 A1* | 7/2017 | Ofek | ................... | G06F 3/04883 |
| 2019/0129607 A1* | 5/2019 | Saurabh | .................. | G06F 3/011 |
| 2020/0257371 A1* | 8/2020 | Sung | ........................ | G06F 3/017 |
| 2020/0301513 A1* | 9/2020 | Mejia Cobo | ............ | G06F 3/011 |
| 2023/0251720 A1* | 8/2023 | Wren | .................. | G06F 3/04883 |
| | | | | 715/702 |

OTHER PUBLICATIONS

Qeshmy et al., "Managing Human Errors: Augmented Reality Systems as a Tool in the Quality Journey," Procedia Manufacturing, vol. 28, 2019, pp. 24-30.

* cited by examiner

DEVICES AND METHODS FOR CONTROLLING ELECTRONIC DEVICES OR SYSTEMS WITH PHYSICAL OBJECTS

CROSS-REFERENCE TO RELATED APPLICATIONS

This application claims the benefit of U.S. Provisional Application No. 63/266,626, filed Jan. 10, 2022, the content of which is incorporated herein by reference in its entirety for all purposes.

FIELD

This relates generally to computer systems that detect a change in a physical environment and perform an action at a respective computer system in accordance the detected change in the physical environment.

BACKGROUND

A user may interact with a computer system using one or more input devices (e.g., a mouse, a touch sensor, a proximity sensor, and/or an image sensor). Sensors of the computer system can be used to capture images of the physical environment around the computer system (e.g., an operating environment of the computer system).

SUMMARY

Some examples described in this disclosure are performed at a first electronic device (e.g., a computer system) that is in communication with a display and one or more input devices. In some examples, the first electronic device detects a change in a physical environment of the first electronic device due to movement of one or more physical objects in the physical environment indicative of a user input. In some examples, the first electronic device performs a first action at the first electronic device or at a second electronic device in communication with the first electronic device in accordance with the change in the physical environment due to movement of the one or more physical objects in the physical environment.

DETAILED DESCRIPTION

Figure 1A:
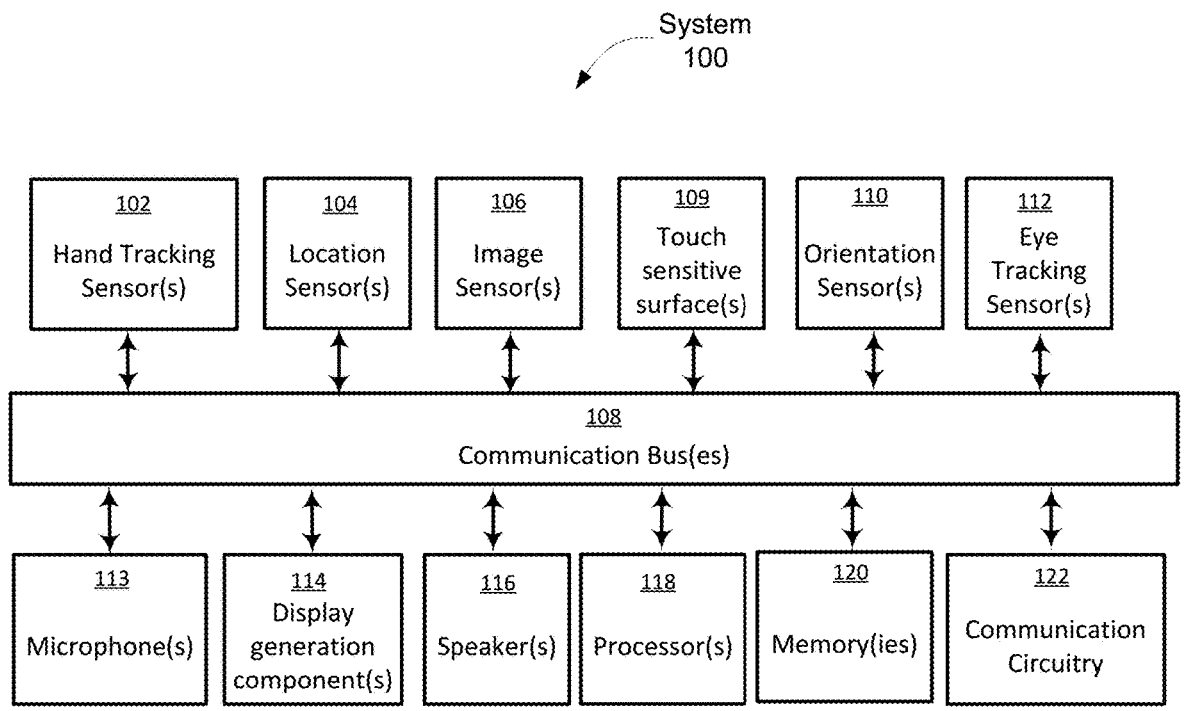
FIGS. 1A-1B illustrate example block diagrams of architectures for a system or device in accordance with some examples of the disclosure.

In the following description, reference is made to the accompanying drawings which form a part hereof, and in which it is shown by way of illustration specific examples that are optionally practiced. It is to be understood that other examples of the disclosure are optionally used and structural changes are optionally made without departing from the scope of the disclosure.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, although the following description uses terms "first," "second," etc. to describe various elements, these elements should not be limited by the terms. These terms are only used to distinguish one element from another. For example, a first device could be termed a second device, and, similarly, a second device could be termed a first device, without departing from the scope of the various described examples. The first device and the second device are both devices, but they are typically not the same device.

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
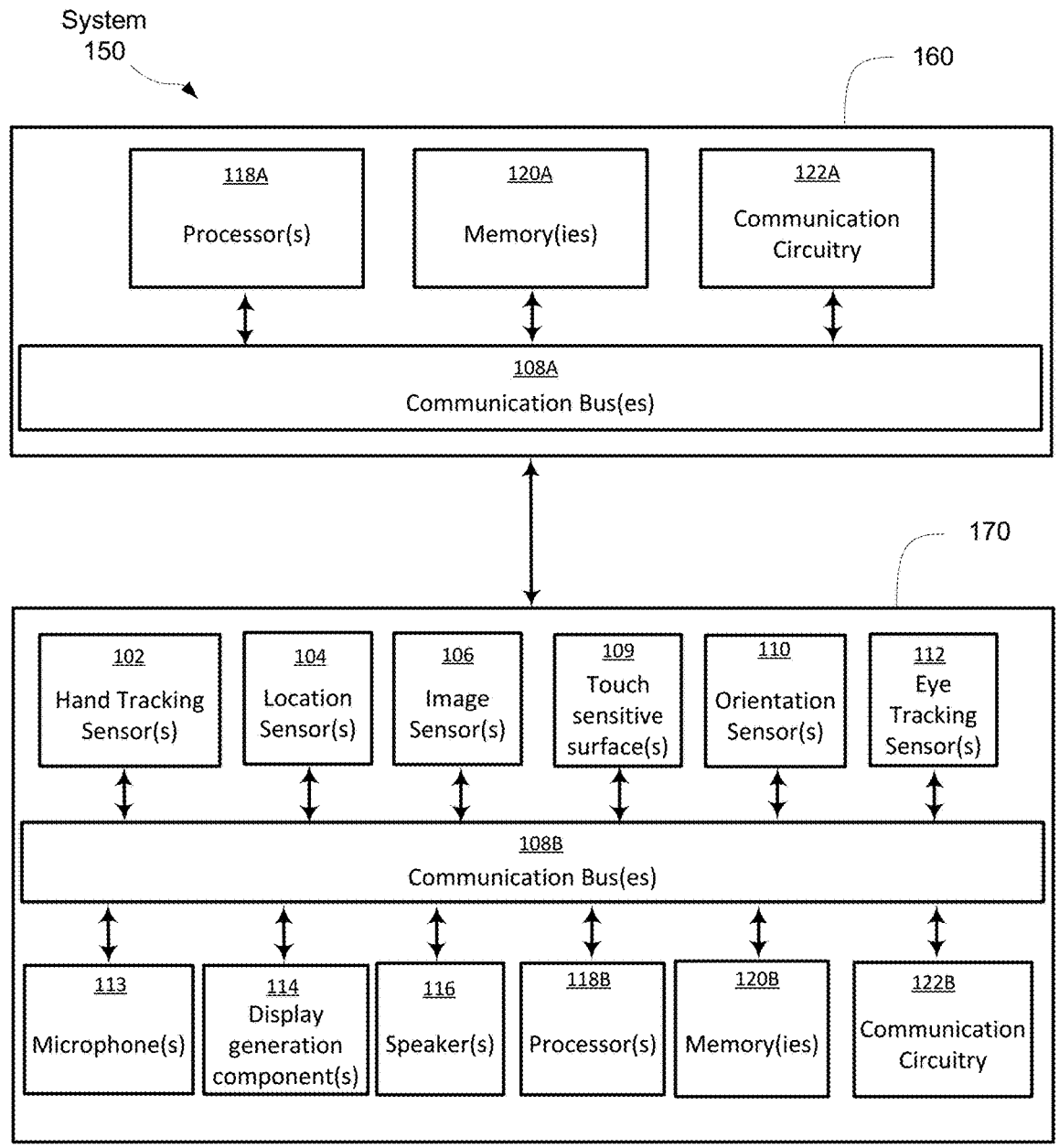

FIGS. 1A-1B illustrate example block diagrams of architectures for a system or device in accordance with some examples of the disclosure. As illustrated in FIG. 1A, device 100 optionally includes various sensors (e.g., one or more hand tracking sensor(s) 102, one or more location sensor(s) 104, one or more image sensor(s) 106, one or more touch-sensitive surface(s) 109, one or more motion and/or orientation sensor(s) 110, one or more eye tracking sensor(s) 112, one or more microphone(s) 113 or other audio sensors, etc.), one or more display generation component(s) 114, one or more speaker(s) 116, one or more processor(s) 118, one or more memories 120, and/or communication circuitry 122. One or more communication buses 108 are optionally used for communication between the above mentioned components of device 100. In some examples, device 100 is a portable device, such as a mobile phone, smart phone, a tablet computer, a laptop computer, an auxiliary device in communication with another device, etc.

Communication circuitry 122 optionally includes circuitry for communicating with electronic devices, networks, such as the Internet, intranets, a wired network and/or a wireless network, cellular networks and wireless local area networks (LANs). Communication circuitry 122 optionally includes circuitry for communicating using near-field communication (NFC) and/or short-range communication, such as Bluetooth®.

Processor(s) 118 optionally include one or more general purpose processors, one or more graphics processors, and/or one or more digital signal processors (DSPs). In some examples, memory 120 is a non-transitory computer-readable storage medium (e.g., flash memory, random access memory, or other volatile or non-volatile memory or storage) that stores computer-readable instructions and/or programs configured to be executed by processor(s) 118 to perform the techniques, processes, and/or methods described below. In some examples, memories 120 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 114 optionally include a single display (e.g., a liquid-crystal display (LCD), organic light-emitting diode (OLED), or other types of display). In some examples, display generation component(s) 114 include multiple displays. In some examples, display generation component(s) 114 includes a display with a touch-sensitive surface (e.g., a touch screen), a projector, a holographic projector, a retinal projector, etc.

In some examples, device 100 includes touch-sensitive surface(s) 109 configured to receive user inputs (touch and/or proximity inputs), such as tap inputs and swipe inputs or other gestures. In some examples, display generation component(s) 114 and touch-sensitive surface(s) 109 together form touch-sensitive display(s) (e.g., a touch screen integrated with device 100 or external to device 100 that is in communication with device 100).

Image sensors(s) 106 optionally include one or more visible light image sensor, such as charged coupled device (CCD) sensors, and/or complementary metal-oxide-semiconductor (CMOS) sensors operable to obtain images of physical objects from the real-world environment. Image sensor(s) 106 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 106 optionally include one or more cameras configured to capture movement of physical objects in the real-world environment. Image sensor(s) 106 optionally include one or more depth sensors configured to detect the distance of physical objects from device 100. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 100 uses CCD sensors, event cameras, and depth sensors in combination to detect the physical environment around device 100. In some examples, image sensor(s) 106 include a first image sensor and a second image sensor. The first image sensor and the second image sensor work together and are optionally configured to capture different information of physical objects in the real-world environment. In some examples, the first image sensor is a visible light image sensor and the second image sensor is a depth sensor. In some examples, device 100 uses image sensor(s) 106 to detect the position and orientation of device 100 and/or display generation component(s) 114 in the real-world environment. For example, device 100 uses image sensor(s) 106 to track the position and orientation of display generation component(s) 114 relative to one or more fixed objects in the real-world environment.

In some examples, device 100 optionally includes hand tracking sensor(s) 102 and/or eye tracking sensor(s) 112. Hand tracking sensor(s) 102 are configured to track the position/location of a user's hands and/or fingers, and/or motions of the user's hands and/or fingers with respect to the computer-generated environment, relative to the display generation component(s) 114, and/or relative to another coordinate system. Eye tracking sensor(s) 112 are configured to track the position and movement of a user's gaze (eyes, face, and/or head, more generally) with respect to the real-world or computer-generated environment and/or relative to the display generation component(s) 114. In some examples, hand tracking sensor(s) 102 and/or eye tracking sensor(s) 112 are implemented together with the display generation component(s) 114 (e.g., in the same device). In some examples, the hand tracking sensor(s) 102 and/or eye tracking sensor(s) 112 are implemented separate from the display generation component(s) 114 (e.g., in a different device).

In some examples, the hand tracking sensor(s) 102 uses image sensor(s) 106 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 106 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 112 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 100 optionally includes microphones(s) 113 or other audio sensors. Device 100 uses microphone(s) 113 to detect sound from the user and/or the real-world environment of the user. In some examples, microphone(s) 113 includes an array of microphones that optionally operate together (e.g., to identify ambient noise or to locate the source of sound in space of the real-world environment).

Device 100 optionally includes location sensor(s) 104 configured to detect a location of device 100 and/or of display generation component(s) 114. For example, location sensor(s) 104 optionally includes a GPS receiver that receives data from one or more satellites and allows device 100 to determine the device's absolute position in the physical world.

Device 100 optionally includes motion and/or orientation sensor(s) 110 configured to detect orientation and/or movement of device 100 and/or display generation component(s) 114. For example, device 100 uses orientation sensor(s) 110 to track changes in the position and/or orientation of device 100 and/or display generation component(s) 114 (e.g., with respect to physical objects in the real-world environment). Orientation sensor(s) 110 optionally include one or more gyroscopes, one or more accelerometers, and/or one or more inertial measurement units (IMUs).

It is understood that the architecture of FIG. 1A is an example architecture, but that system/device 100 is not limited to the components and configuration of FIG. 1A. For example, the device/system can include fewer, additional, or other components in the same or different configurations. In some examples, as illustrated in FIG. 1B, system/device 150 can be divided between multiple devices. For example, a first device 160 optionally includes processor(s) 118A, memory or memories 120A, and communication circuitry 122A, optionally communicating over communication bus(es) 108A. A second device 170 (e.g., corresponding to device 100) optionally includes various sensors (e.g., one or more hand tracking sensor(s) 102, one or more location sensor(s) 104, one or more image sensor(s) 106, one or more touch-sensitive surface(s) 109, one or more motion and/or orientation sensor(s) 110, one or more eye tracking sensor(s) 112, one or more microphone(s) 113 or other audio sensors, etc.), one or more display generation component(s) 114, one or more speaker(s) 116, one or more processor(s) 118B, one or more memories 120B, and/or communication circuitry 122B. One or more communication buses 108B are optionally used for communication between the above-mentioned components of device 170. The details of the components for devices 160 and 170 are similar to the corresponding components discussed above with respect to device 100 and are not repeated here for brevity. First device 160 and second device 170 optionally communicate via a wired or wireless connection (e.g., via communication circuitry 122A-122B) between the two devices.

As described herein, in some examples, physical objects, even those without communication circuitry or electric circuitry, can be used to cause an electronic device to perform an action (e.g., control functionality of electronic device). For example, movement of a physical object or the results of movement of the physical object (or more generally a change in the physical environment device due to movement of one or more physical objects in the physical environment) can be indicative of a user input, which can be detected by sensors of an electronic device (e.g., image sensors, proximity sensors, etc.). In some examples, an electronic device performs a first action in accordance with the change in the physical environment due to movement of the one or more physical objects in the physical environment. In some examples, before the physical object can be used to cause an electronic device to perform an action, a configuration process (also referred to herein as an "enrollment process") can be used to associate a physical object, one or more boundaries, and/or the associate action. Thus, the use of physical objects can be used to implement functionality for an electronic device, which may provide convenient or alternative ways of controlling a device using physical objects that are not otherwise communicatively coupled with the electronic device and/or without interactive directly with user interfaces displayed to the user of the electronic device.

Figure 2A:
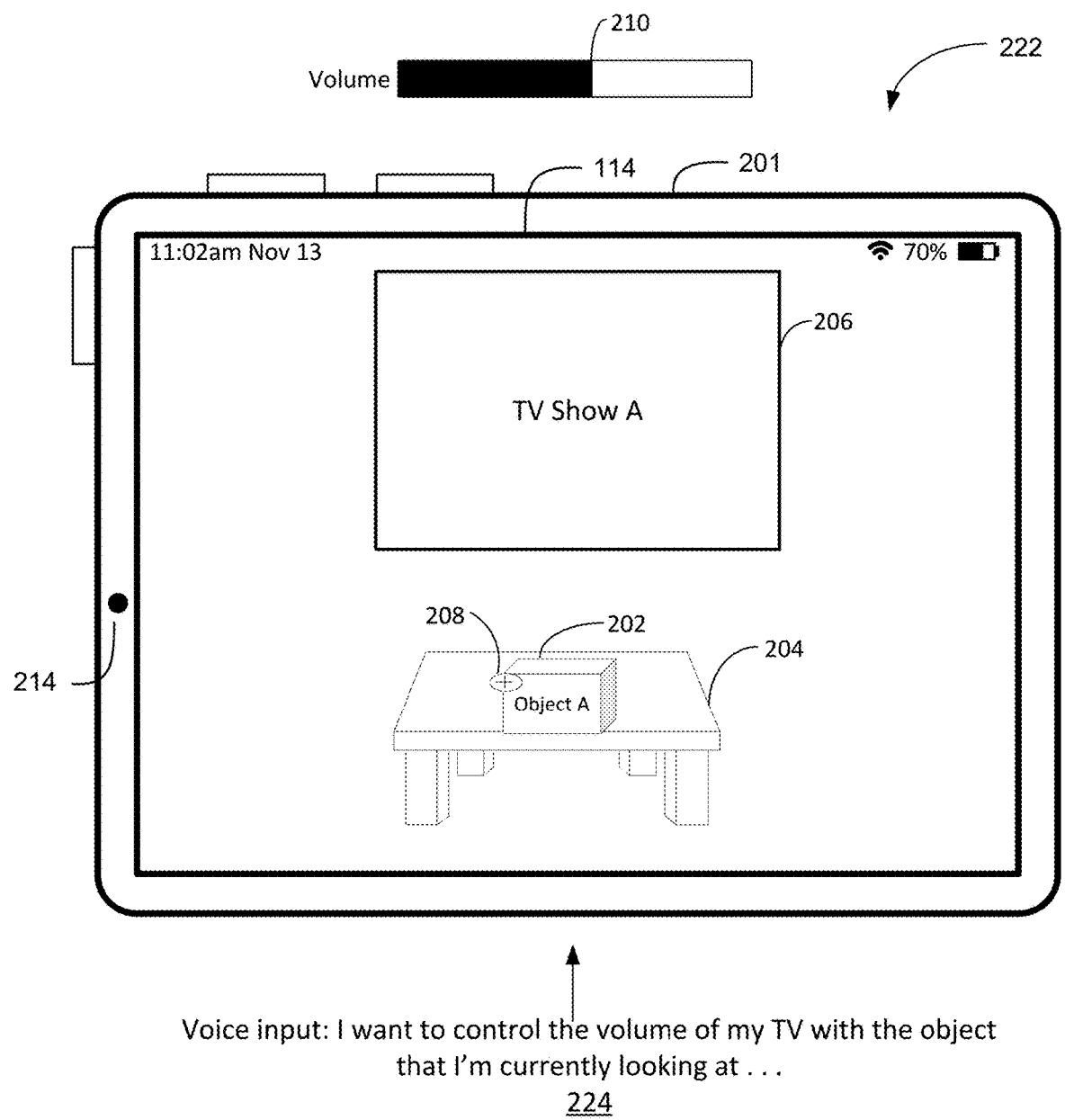
FIGS. 2A-2E illustrate examples of an electronic device adjusting the volume of a television based on movement of one or more physical objects in accordance with some examples of the disclosure.

FIGS. 2A-2E illustrate examples of an electronic device adjusting the volume of a television based on movement of one or more physical objects in accordance with some examples of the disclosure. FIG. 2A illustrates an electronic device 201 that includes a display generation component (e.g., display generation component 114 in FIGS. 1A and 1B) and one or more image sensors 214 (e.g., one or more sensors 102-112 described in FIGS. 1A and 1B). In some examples, the one or more image sensors 214 include one or more external sensors (e.g., sensors that face outwards from the user) to detect objects and movement of the user's hands in the physical environment 222 of the electronic device 101 and/or one or more internal sensors (e.g., sensors that face inwards towards the face of the user) to detect the attention (e.g., gaze) of the user. In some examples, the physical objects in the physical environment are presented by the electronic device 201 (e.g., displayed using display generation component 114).

In some examples, physical objects in the physical environment 222 of the electronic device 201 are presented by the electronic device 201 via a transparent or translucent display (e.g., the display of device 201 does not obscure the user's view of objects in the physical environment, thus allowing those objects to be visible). For example, as shown in FIG. 2A, the electronic device 201 is presenting, via the transparent or translucent display generation component 114, objects in the physical environment 222, including a television 206 that is currently playing TV Show A at a first playback volume level 210, a table 204, and a physical object 202 (e.g., a pen, coffee mug, flashlight, comb, computer, phone, tablet or the like).

In some examples, the electronic device 201 receives an input from a user corresponding to a request to control an electronic device (e.g., electronic device 201 or a second electronic device, such as television 206) with a physical object in the physical environment 222 (as described in more detail below, in process 600, and FIGS. 3A-3D). The physical object that the user is requesting to use to control an electronic device optionally does not include electronic circuitry and/or communication circuitry with which to communicate with the electronic device 201 (or the second electronic device (e.g., television 206)). In some examples, the input received by the electronic device 201 for controlling a respective electronic device with a physical object includes a predetermined gesture/movement input (as will be described in FIGS. 3A-3D), voice input, and/or gaze input. For example, in FIG. 2A, the electronic device 201 is receiving the voice input 224 stating "I want to control the volume of my TV with the object that I'm currently looking at," while the electronic device 201 is also detecting that the attention of the user is currently directed to Object A 202. In some examples, the electronic device 201 detects that the attention of the user in FIG. 2A is directed to Object A 202 in response to the electronic device 201 detecting, via the one or more image sensors 214, that a gaze (e.g., represented by oval 208 with a plus sign) of the user is currently directed to Object A 202 (as illustrated in FIG. 2A). Additionally or alternatively, the electronic device 201 optionally detects that the attention of the user was directed to Object A 202 in response to the electronic device 201 detecting, via the one or more image sensors 214 and/or an orientation sensor (e.g., orientation sensor 110), that a head of the user is currently oriented towards Object A 202. Additionally or alternatively, the electronic device 201 optionally receives a voice input stating "I want to control the volume of my TV with the Object A" such that Object A 202 can be identified by electronic device 201 without requiring the user to gaze at Object A 202. It should be understood that while FIG. 2A describes an example where the electronic device 201 is receiving input to control the television 206 (e.g., a second electronic device), the electronic device 201 can optionally receive input for controlling a system function of electronic device 201 with Object A 202, such as controlling a brightness of the electronic device 201, a playback position of a media item that is being played by electronic device 201, etc. It should also be understood that the invention described herein is not limited to the example described in FIGS. 2A-2E, but optionally applies to other devices/systems that are in communication with electronic device 201, such as internet of things (IoT) devices/systems.

Figure 2B:
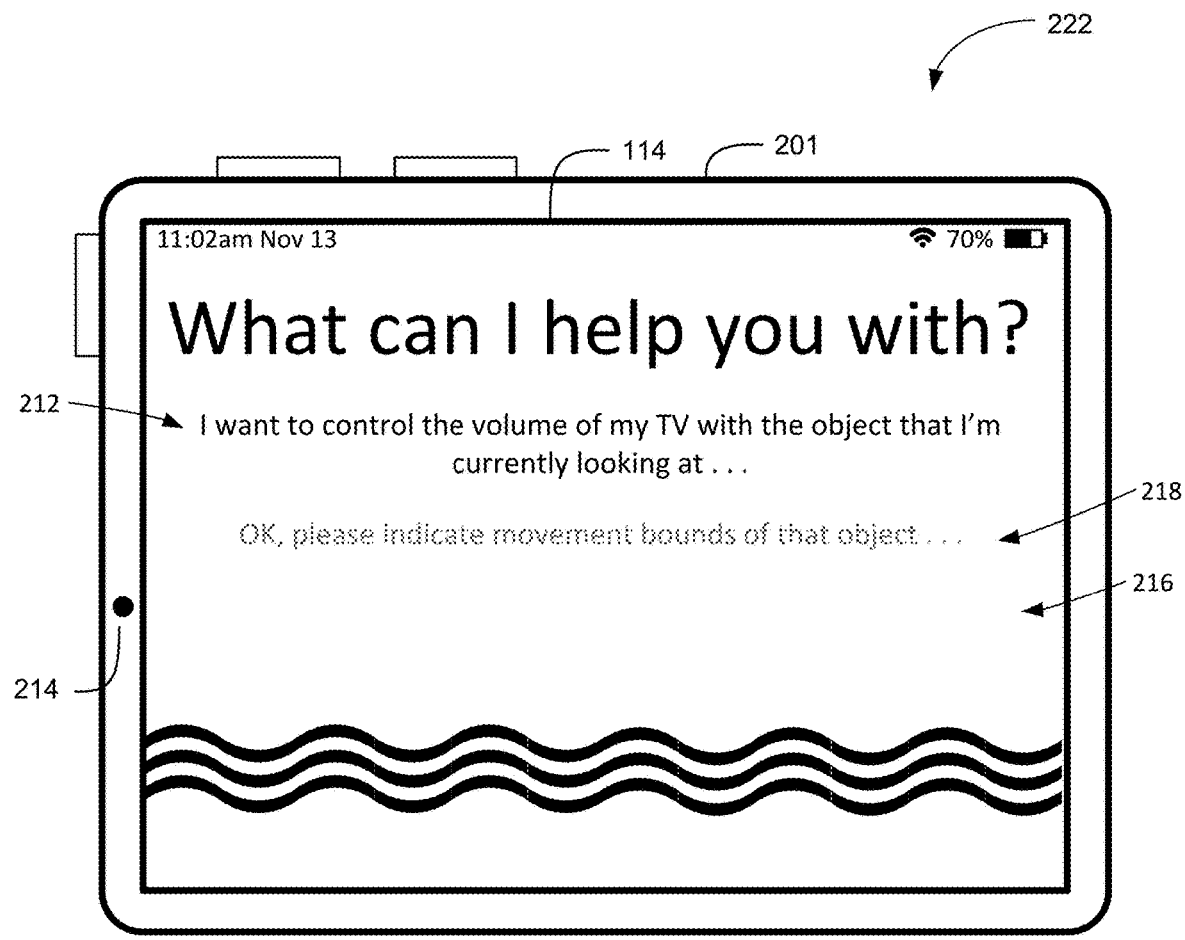
Figure 2C:
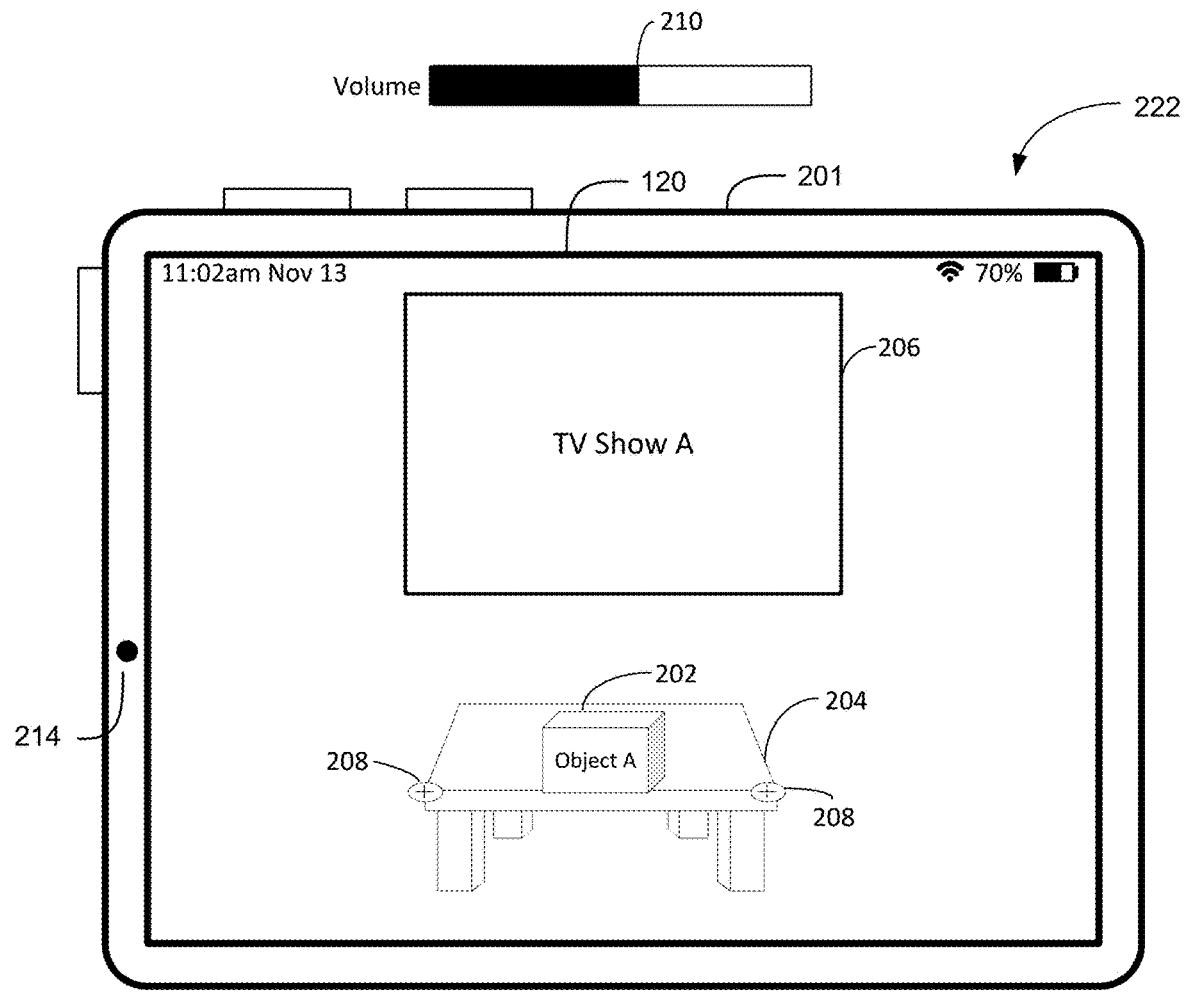

In response to the electronic device 201 receiving the input in FIG. 2A that included voice input 224 and gaze (e.g., represented by oval 208), the electronic device 201 optionally initiates a process to control the volume of television 206 with Object A 202, as illustrated in FIG. 2B. In FIG. 2B, the electronic device 201 is displaying a voice assistance user interface 216 (e.g., a system function of the electronic device 201 that enables hands-free operation of the electronic device 201) that includes an indication 212 of the voice input 224 provided in FIG. 2A and an indication 218 that indicates the next operation in configuring Object A 202 to control the volume of the television 206. As shown, in some examples, the indication is a text based instruction prompting a user to provide/select the movement boundaries of Object A 202 for purposes of controlling the volume. It should be understood that while FIG. 2B illustrates the electronic device 201 displaying the voice assistance user interface 216 in response to the electronic device 201 receiving the input described in FIG. 2A, the electronic device 201 could also initiate the process to configure Object A 202 to control the volume of television 206 without displaying the voice assistance user interface 216 (e.g., communicate the remaining operations of the configuration process/instructions via a speaker of the electronic device 201 without displaying the voice assistance user interface 216). Although a visual representation of the interaction with a voice assistance user interface is shown in FIG. 2B, it is understood that the interaction can use audio input only (e.g., using speaker and microphone), partially use audio input (optionally, with other input/output such as visual notifications, haptic feedback, etc.), and/or use not audio (e.g., using text driven or other user interface).

In some examples, device 201 can initiate an enrollment process where the user can indicate the movement boundaries of Object A 202. As shown in FIG. 2B, in some examples, configuring Object A 202 to control the volume of television 206 includes indicating the minimum and/or maximum movement boundaries of Object A 202 (optionally relative to another physical object in the physical environment 222 (e.g., table 204), as will be described below). The minimum and maximum movement boundaries can represent end points of a slider-type control, where Object A 202 acts as the slider. In some examples, during and/or after successful enrollment, device 201 can provide a visual indicator (e.g., a virtual line between the minimum and maximum movement boundaries, a virtual indication of the maximum and minimum boundaries, a virtual representation of tick marks along the virtual line, and/or textual labels of "maximum" and "minimum" at maximum movement boundaries, etc.) to demonstrate the movement path of the slider-type control.

In some examples, device 201 can prompt the user to select a minimum movement boundary and maximum movement boundary. For example, device 201 can display a first text prompt (and/or audio prompt) asking the user to move Object A 202 to a minimum movement boundary location. After completion, device 201 can display a second text prompt (and/or audio prompt) asking the user to move Object A 202 to a maximum movement boundary location.

As will also be described in more detail below, after successfully configuring Object A 202 to control the volume of television 206 (e.g., after successful enrollment), the electronic device 201 optionally sets the volume of television 206 at 0% when the electronic device 201 is detecting that Object A 202 is located at the minimum movement boundary, and optionally sets the volume of television 206 at 100% when the electronic device 201 is detecting that Object A 202 is located at the maximum movement boundary. In some examples, the electronic device 201 detects gaze input from the user to indicate the minimum and maximum movement boundaries of Object A 202. For example, in FIG. 2C, after the electronic device 201 displayed the indication 218 in FIG. 2B to indicate to the user that input indicating the minimum and maximum movement boundaries of Object A 202 is required, the electronic device 201 detected the user provided a first input that included the gaze represented by oval 208 directed to the front-left corner of table 204 to select the front-left corner of the table 204 as the minimum movement boundary of Object A 202 and a second input that included the gaze represented by oval 208 directed to the front-right corner of table 204 to select the front-right corner of the table 204 as the maximum movement boundary of Object A 202.

It should be understood that while the electronic device 201 detected gaze input from the user to select the minimum and maximum movement boundaries of Object A 202, the electronic device 201 could have also additionally, or alternatively, detected other forms of input to indicate the minimum and maximum movement boundaries of Object A 202, such as detecting, via the one or more image sensors 214, that a hand of the user tapped on the front-left and front-right corners of the table 204 to indicate the minimum and maximum movement boundaries of Object A 202, respectively, or detecting that the user performed a predefined gesture (e.g., pinch or tap gesture that does not touch or contact the electronic device 201) while the attention (e.g., gaze represented by oval 208) of the user is directed to the front-left portion and front-right portion of the table 204 to indicate the minimum and maximum movement boundary of Object A 202.

Figure 2D:
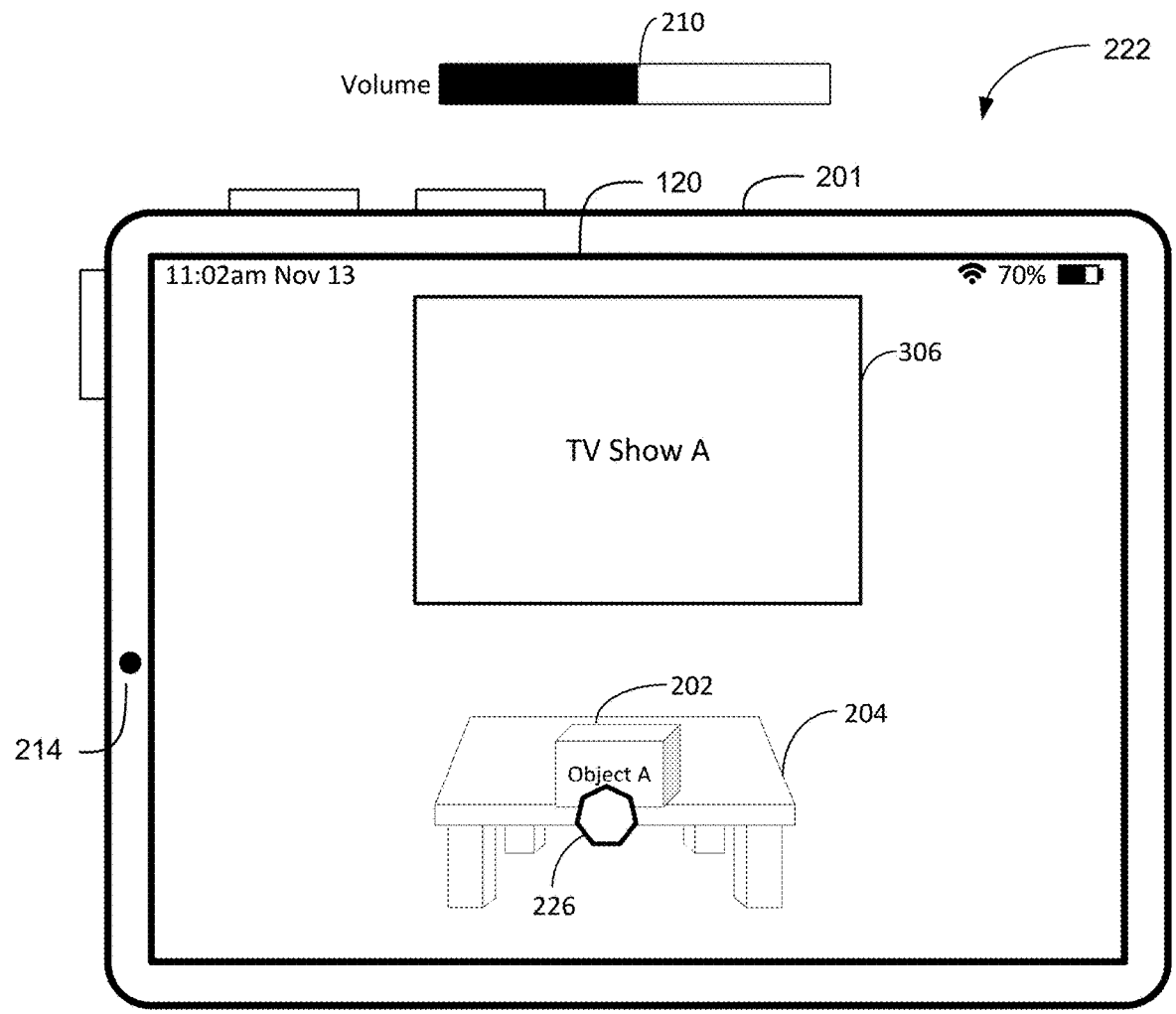
Figure 2E:
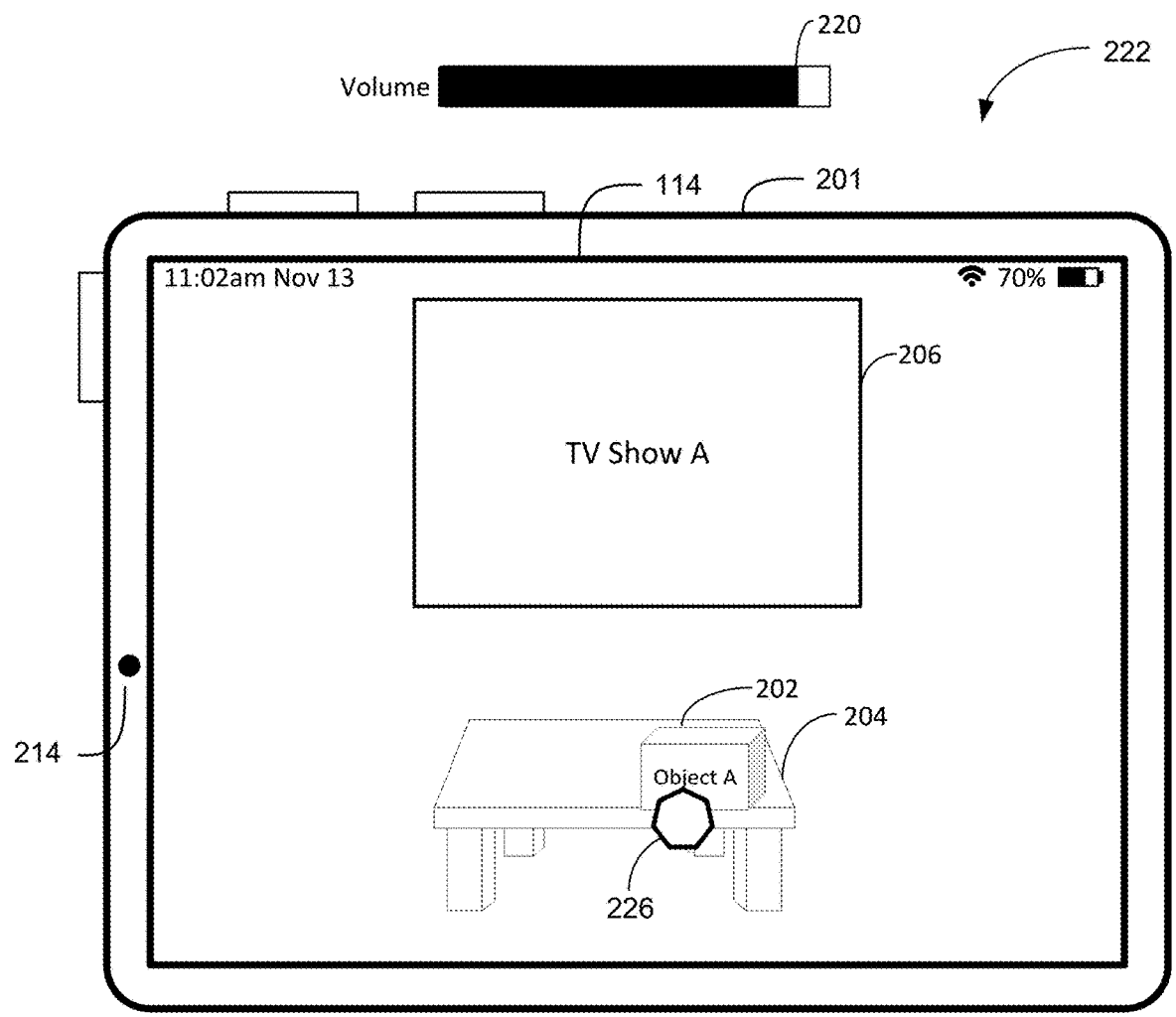

In some examples, the electronic device 201 detects, via the one or more image sensors 214, changes in the physical environment 222. For example, in FIG. 2D, after receiving the one or more inputs selecting the minimum and maximum movement boundaries in FIG. 2C, the electronic device 201 is now detecting that the hand (e.g., represented by hexagon 226) of the user has moved into the range of the one or more sensors 214 and is grabbing (e.g., holding) Object A 202 in the physical environment 222 (as compared to FIG. 2C where the hand (e.g., represented by hexagon 226) was not in the range of the one or more image sensors 214 and was not grabbing Object A 202). The electronic device 201 optionally detects that the hand (e.g., represented by hexagon 226) of the user in FIG. 2D is grabbing Object A 202 as a result of (e.g., in response to) the one or more image sensors 214 capturing one or more images of a user (or part of a user, such the user's hand) while the user is interacting with the physical environment 222. In FIG. 2E, while the hand (e.g., represented by hexagon 226) of the user is continuing to grab/hold Object A 202, the electronic device 201 is detecting that the hand (e.g., represented by hexagon 226) of the user has moved Object A 202 from the location in the physical environment 222 illustrated in FIG. 2D (e.g., the front-middle portion of the table 204) to the location in the physical environment 222 illustrated in FIG. 2E (e.g., slightly offset to the left of the front-right portion of the table 204, which corresponds to the maximum movement boundary of Object A 202 (as described previously with respect to FIG. 2C)).

In some examples, the volume level of the television 206 is (e.g., incrementally/gradually) adjusted as the location of Object A 202 relative to the selected minimum and maximum movement boundaries of Object A 202 changes. For example, as shown in FIG. 2E, the electronic device 201 has modified/updated the volume of television 206 from the volume level 210 (e.g., corresponding to a 50% volume level at the television 206) illustrated in FIG. 2D to the volume level 220 illustrated in FIG. 2E (e.g., corresponding to a 95% volume level at the television 206) in response to the electronic device 201 detecting movement of Object A 202 from a location in the physical environment 222 that is equidistance (e.g., a midpoint) between the minimum and maximum movement boundaries of Object A 202 as illustrated in FIG. 2D to a location in the physical environment 222 that is 5 units (e.g., inches, feet, yards, etc.) from the maximum movement boundary of Object A 202 (e.g., the front-right portion of the table 204) and 95 units (e.g., inches, feet, yards, etc.) from the minimum movement boundary of Object A 202 (e.g., the front-left portion of the table 204). As the electronic device 201 was detecting movement of the Object A 202 from the location in the physical environment 222 illustrated in FIG. 2D to the location in the physical environment 222 illustrated in FIG. 2E, the electronic device 201 optionally continuously updated the volume of the television 206 from the 50% volume level to the 95% volume level by 1%, 2%, 3%, 5%, or 10% (or any other suitable amount)—as opposed to only updating the volume of the television 206 after the electronic device 201 detects that Object A 202 is no longer moving in the physical environment 222. While FIGS. 2D and 2E show the volume of the television 206 being adjusted in accordance with the horizontal movement of Object A 202, it should be understood that the volume of television 206 could also be adjusted in accordance with vertical movement of Object A 202 in the physical environment 222 (e.g., if the minimum and maximum movement boundaries of Object A 202 are at different positions along a Y-axis (e.g., vertical location relative to the viewpoint of the user) vs. along an X-axis (e.g., horizontal location relative to the viewpoint of the user) as illustrated in FIGS. 2A-2E. Further, in some examples where the minimum and maximum movement boundaries of Object A 202 are at different positions along a Y-axis, the electronic device 201 optionally forgoes updating the volume of television 206 in accordance with the movement of Object A 202 when Object A 202 is moved in an X and/or Z direction without the Y position of Object A 202 changing.

After detecting the movement of Object A 202 to the location in the physical environment indicated in FIG. 2E, the electronic device 201 optionally updates/modifies the volume of the television 206 in response to detecting further movement of Object A 202 in the physical environment 222. For example, after the electronic device 201 updated the volume of the television 206 to the volume level 220 (e.g., corresponding to a 95% volume level at the television 206), the electronic device 201 optionally detects further movement of Object A 202 by the hand of the user. If the detected further movement of Object A 202 included movement of Object A 202 by 1, 2, 3, 4, or 5 units (e.g., inches, feet, yards) to the right of the physical location of Object A 202 illustrated in FIG. 2E, the electronic device 101 optionally increases the volume at the television 206 by 1%, 2%, 3%, 4%, or 5% to a 96%, 97%, 98%, 99%, or 100% volume level at the television 206, respectively. Conversely, if the further movement of Object A 202 included movement of Object A 202 by 5, 10, 15, 20, or 25 units (e.g., inches, feet, yards) to the left of the physical location of Object A 202 illustrated in FIG. 2E, the electronic device 201 optionally decreases the volume at the television 206 by 5%, 10%, 15%, 20%, or 25% to a 90%, 80%, 75%, 70%, or 65% volume level at the television 206, respectively.

Although the example of FIGS. 2A-2E primarily describe a linear scale between the minimum and maximum movement boundaries and the corresponding volume adjustment, it is understood that in some examples, a non-linear correspondence between position and volume may be implemented. Additionally, although FIGS. 2A-2E primarily describe a slider-type functionality (e.g., volume adjustment, brightness adjustment, etc.) defined using maximum and minimum movement boundaries. As described herein, other types of functionality can be implemented (e.g., a knob using rotation of a mug, with the handle optionally representing the position of the knob, a toggle switch as described below with reference to FIGS. 3A-3D, etc.). Additionally, FIGS. 2A-2E primarily describe a configuration process initiated using audio and/or gaze inputs. As described herein, the configuration process can be initiated using other inputs.

In some examples, the functionality can be a switch-type functionality (e.g., a toggle switch). In some examples, the electronic device detects movement of one or more physical objects to toggle on/off a system function at the electronic device (e.g., the device that is detecting the movement of the one or more physical objects) and/or toggle on/off a system function at a second electronic device (e.g., a device that is optionally not detecting the movement of the one or more physical objects), as will now be described with respect to FIGS. 3A-3D.

Figure 3A:
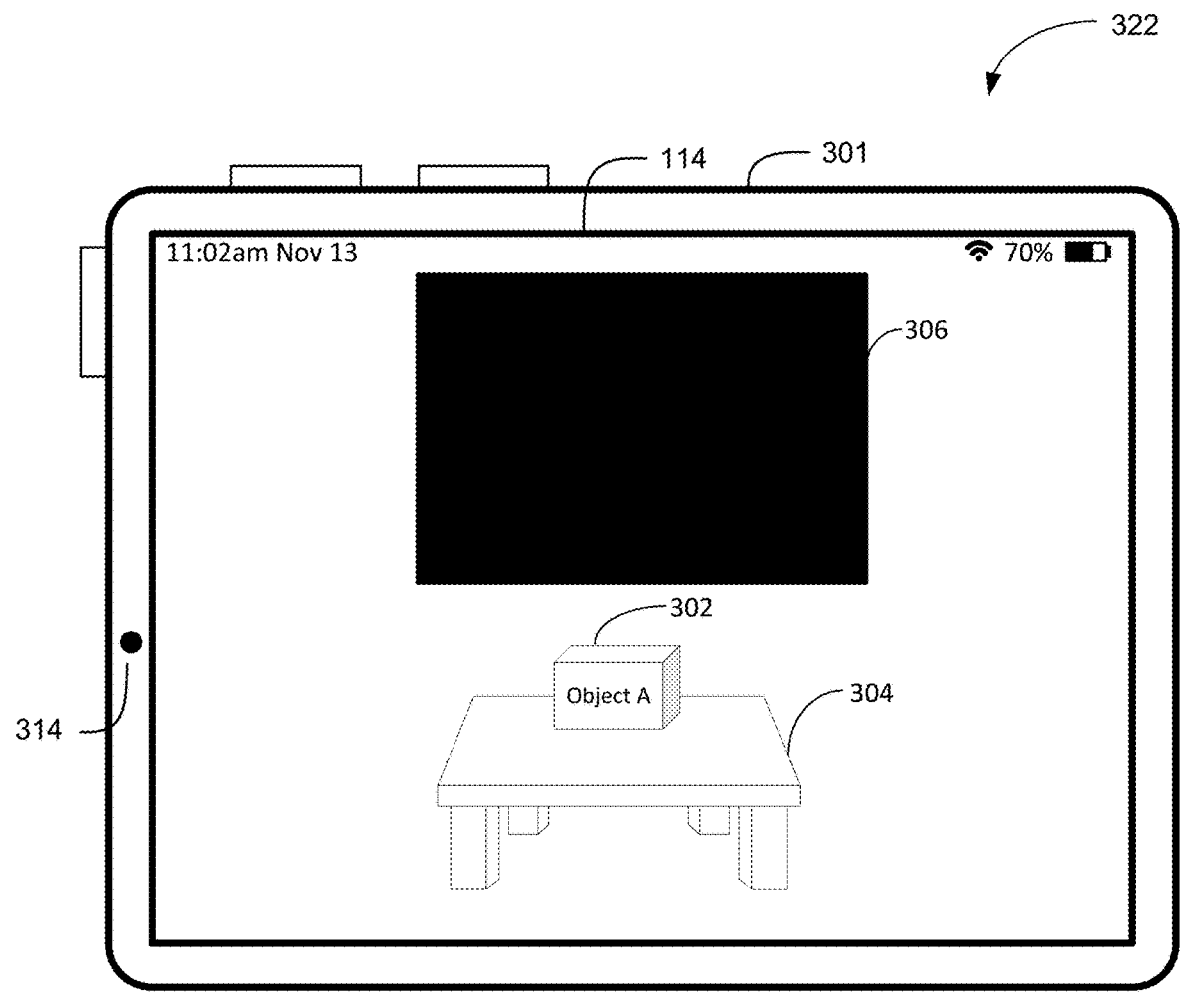
FIGS. 3A-3D illustrate examples of an electronic device detecting movement of one or more physical objects to toggle on/off a system function of the electronic device or at a second electronic device in accordance with some examples of the disclosure.

FIG. 3A illustrates an electronic device 301 that includes a display generation component 114 and one or more image sensors 314. The electronic device 301, display generation component 114, and the one or more image sensors 314 illustrated in FIG. 3A are optionally similar to or the same as the electronic device 201, display generation component 114, and the one or more image sensors 214 described and illustrated in FIGS. 2A-2E, respectively. As also shown in FIG. 3A, the electronic device 301 is presenting, via the transparent or translucent display generation component 114, objects in the physical environment 322 of the electronic device 301, including a television 306 that is currently powered off, a table 304, and a physical object 302 (e.g., a pen, coffee mug, flashlight, comb, computer, phone, tablet, or the like).

Figure 3B:
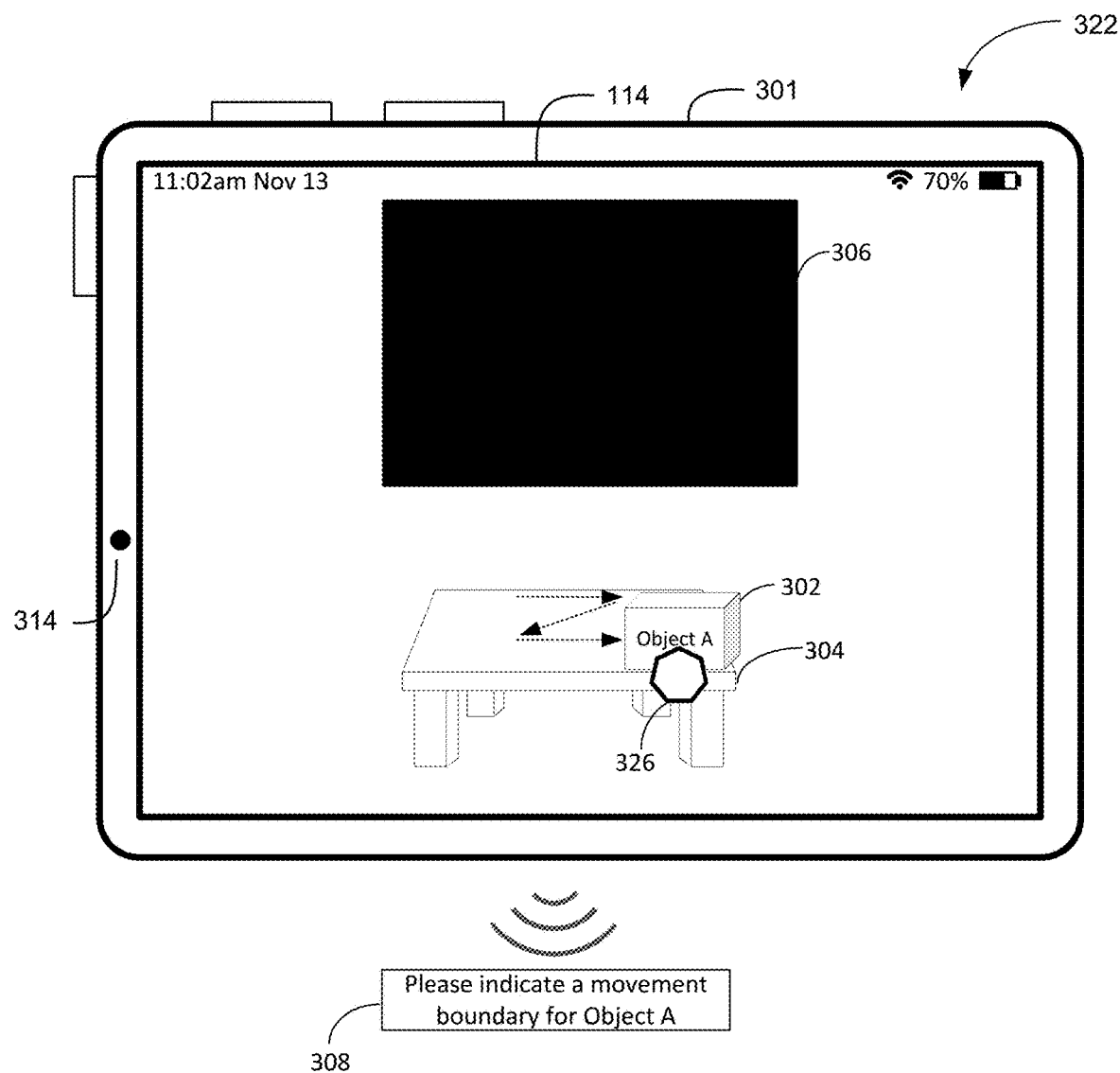

In some examples, the electronic device 301 initiates a process to control a system function of the electronic device 301 or another electronic device with a physical object in the physical environment 322 in response to audio and/or gaze input, as described with reference to FIGS. 2A-2E (e.g., initiating the configuration processes using gaze and/or audio inputs). In some examples, the electronic device 301 initiates a process to control a first system function of the electronic device 301 or a first system function of a second electronic device (e.g., television 306) with a physical object in the physical environment 322 in response to the electronic device 301 detecting that the physical object moved in a pre-determined manner. For example, when the electronic device 301 detects that a physical object has been moved in a left-to-right-to-left-to-right zigzag motion, the electronic device 301 optionally initiates a process to control the on/off state of television 306 with that physical object. Conversely, when the electronic device 301 detects that a physical object has been moved in a right-to-left-to-right-to-left zigzag motion the electronic device 301 optionally initiates a process to control the on/off state of a lighting system (e.g., a different function) in communication with the electronic device 301 (or optionally toggle on/off a 'Do Not Disturb' mode of the electronic device 301) with that physical object. It should be understood that the above described motion and initiating a process to control an associated functionality are examples, and other functionalities can be controlled by different motions. For example, the electronic device 301 is optionally configured to detect a plurality of pre-determined motions, which optionally corresponds to requests to configure different system functions of the electronic device 301 or the second electronic device (e.g., a device/system in communication with the electronic device 301). In some examples, a specific predetermined motion of any object can be detected to initiate a process to use that object for control and the associated functionality can be selected as part of the initiated process (e.g., using audio and/or gaze inputs to indicate the associated functionality) rather than being determined based one of a plurality of predetermined motions. In FIG. 3B, while the television 306 is currently powered off, the electronic device 301 detects that Object A 302 moved in a left-to-right-to-left-to-right zigzag motion, which in this example corresponds to the predetermined motion required for the electronic device 301 to initiate a process to control the on/off state of television 306 with Object A 302. In response to the electronic device 301 detecting movement of Object A 302 in the left-to-right-to-left-to-right zigzag motion in the physical environment 322, the electronic device 301 optionally initiates a process to configure to the on/off state of television 306 to be controlled with Object A 302. In some examples, the process to configure the on/off state of television 306 with Object A 302 includes generating an audio output 308 that indicates to the user the next operation in the configuration process is to select a movement boundary for Object A 302, as illustrated in FIG. 3B. The selected movement boundary is the location in the physical environment 322 that optionally causes the electronic device 301 to power on television 306 if the electronic device 301 detects movement of Object A 302 beyond the selected movement boundary and optionally causes the electronic device 301 to power off television 306 if the electronic device 301 does not detect movement of Object A 302 beyond the selected movement boundary (or remain powered off if television 306 is already powered off), as will be described in more detail below. It is understood that the audio output 308 can also be augmented or replaced by other types of information (e.g., haptic information, visual/textual notifications, etc.)

In some examples, the electronic device 301 receives an input selecting the movement boundary in similar ways described previously in FIGS. 2A-2E. For example, in FIG. 3C, after the electronic device 301 generated the audio output 308 in FIG. 3B requiring the user to indicate the movement boundary of Object A 302, the electronic device 301 detects an input that includes the gaze (e.g., represented by oval 310 with plus sign) of the user directed to the front-middle portion of the table 304 to select the front-middle portion of the table 304 as the movement boundary for Object A 302. It should be understood that while the electronic device 301 detected gaze input from the user to select the movement boundary of Object A 301, the electronic device 301 could have also additionally, or alternatively, detected other forms of input to select the movement boundary of Object A 302, such as detecting, via the one or more image sensors 314, that a hand of the user tapped on the front-middle portion of the table 304 to select the front-middle portion of the table 304 as the movement boundary for Object A 302, or detecting that the user performed a predefined "air" gesture (e.g., pinch or tap gesture that does not touch or contact the electronic device 301) while the attention (e.g., gaze represented by oval 310) of the user is directed to the front-middle portion of the table 304 to select the front-middle portion of the table 304 as the movement boundary for Object A 302.

Figure 3C:
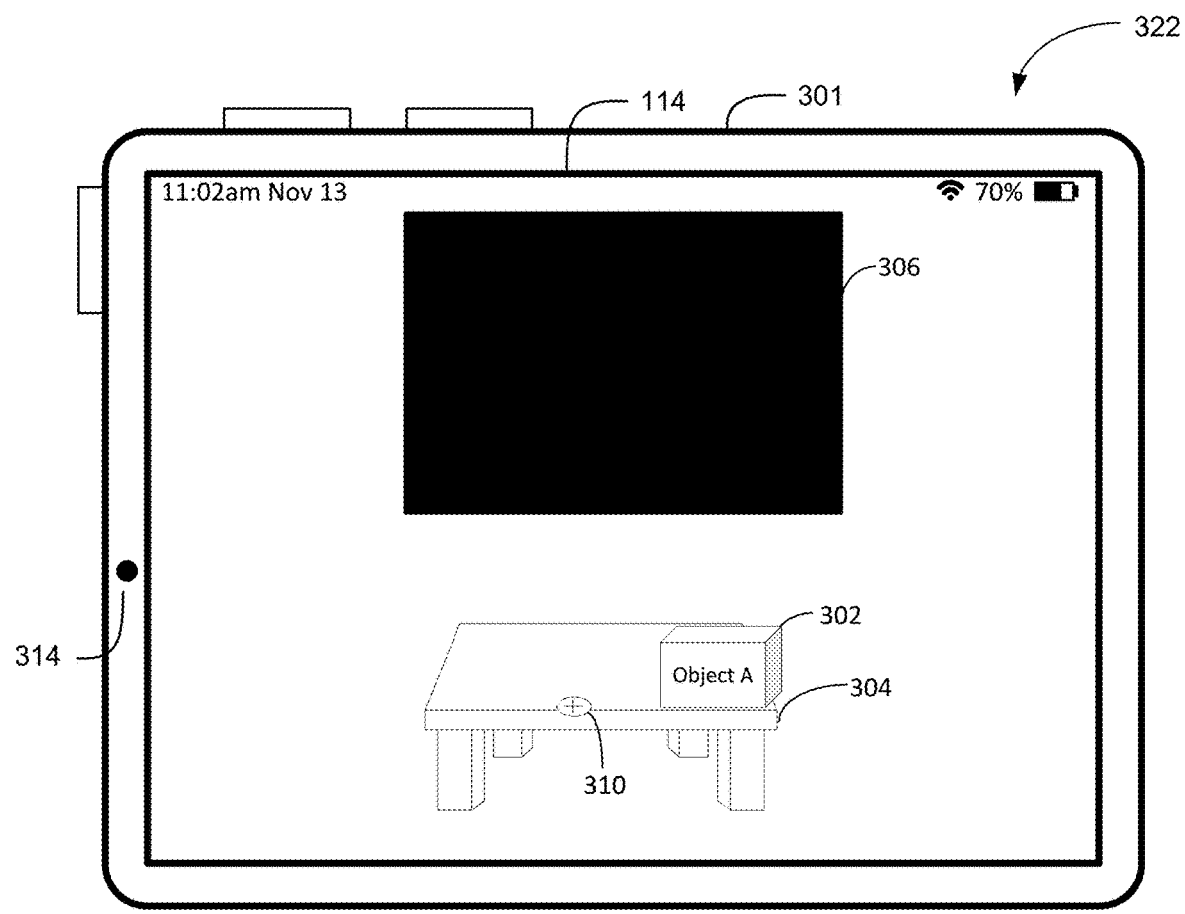
Figure 3D:
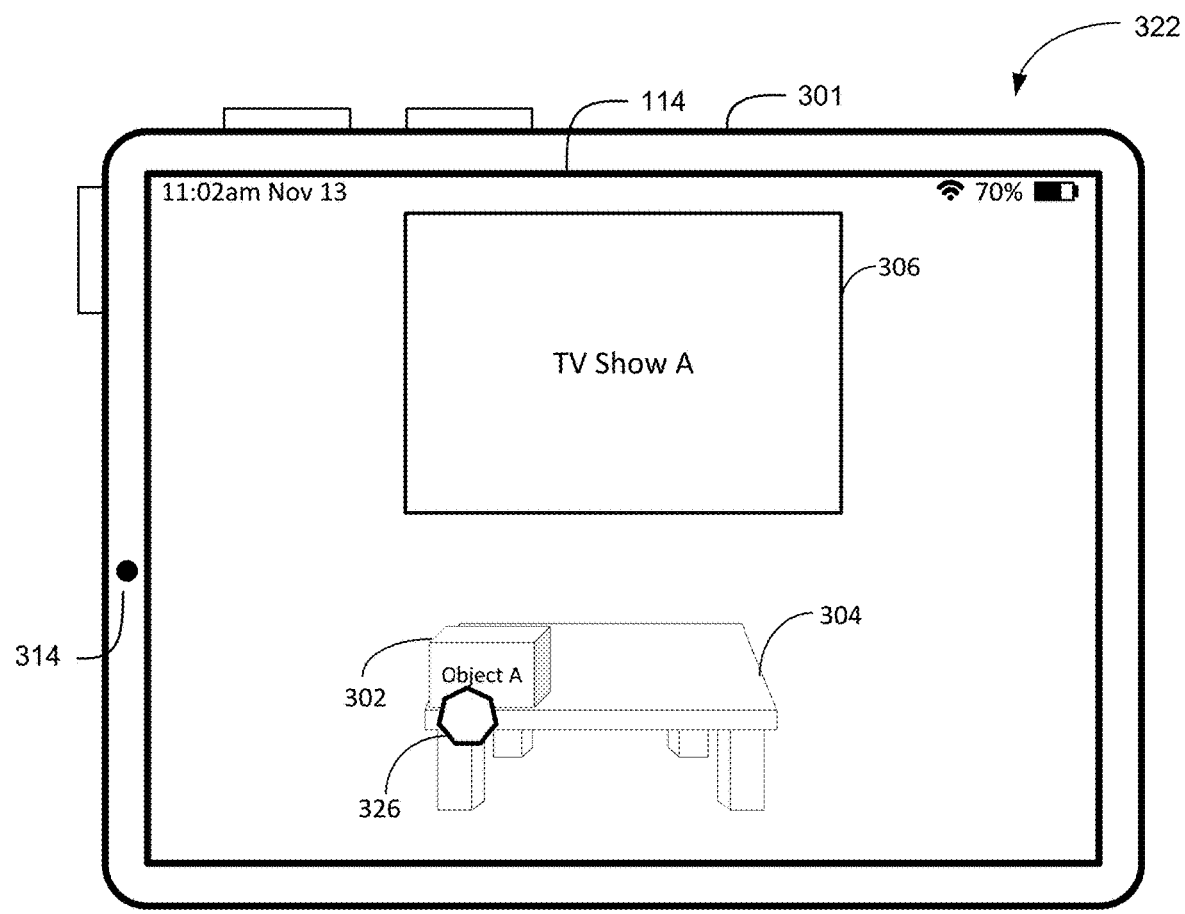

FIG. 3D illustrates a toggling of state (powering on television 306) using Object A 302 after the configuration process. In FIG. 3D, the electronic device 301 detects the hand (e.g., represented by hexagon 326) of the user has moved Object A 302 from the front-right portion of the table 304 to the front-left portion of the table 304, which is beyond the movement boundary selected in FIG. 3C (the front-middle portion of the table 304). In response to the electronic device 301 detecting that Object A 302 has moved beyond the movement boundary selected in FIG. 3C, the electronic device 301 transmits a signal to television 306 for turning on television 306, and in response to the television 306 receiving the transmitted signal from the electronic device 301, the television 306 is powered on (as illustrated in FIG. 3D). While, in FIG. 3D, the television 306 changed from being in a powered off state as illustrated in FIG. 3C to being in a powered on state as illustrated in FIG. 3D in response to the electronic device 301 detecting movement of Object A 302 beyond the movement boundary selected in FIG. 3C, it should be understood that if the electronic device 301 instead detected movement of Object A 302 that was not beyond the movement boundary selected in FIG. 3C, the television 306 would have optionally remained in the powered off state as illustrated in FIG. 3C (as opposed to changing to the powered on state). In some examples, the electronic device 301 detects further movement of Object A 302 after transmitting the signal to television 306 to power on television 306, and in response, the electronic device 301 modifies the on/off state of television 306 in analogous ways as previously described. In some examples, hysteresis can be applied to avoid toggling state when the object is places close to the movement boundary. In some examples, Object A 302 must move a threshold distance beyond the movement boundary in order to toggle the state.

In some examples, the electronic device performs an action at the electronic device or at a second electronic device (e.g., a television, IoT system, or other system/device in communication with the electronic device) in response to detecting input commands written or drawn (e.g., a text-based and/or image-based input command), as will be described now with respect to FIGS. 4A and 4B.

Figure 4A:
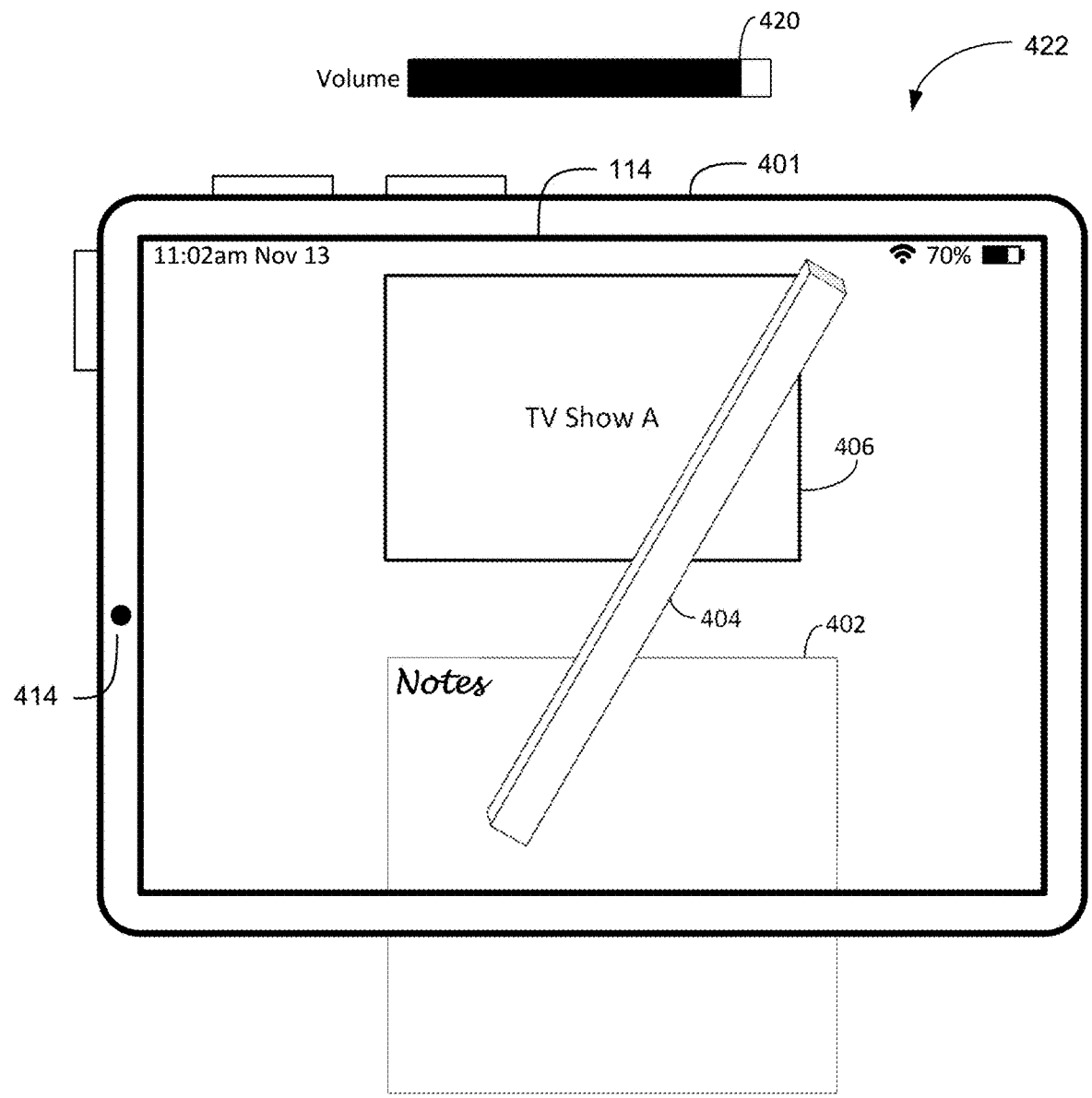
FIGS. 4A-4B illustrate examples of an electronic device performing an action at the electronic device or at a second electronic device in response to detecting a text-based input command.

FIG. 4A illustrates an electronic device 401 that includes a display generation component 114 and one or more image sensors 414. The electronic device 401, display generation component 114, and the one or more image sensors 414 are optionally the same as or similar to the electronic device 201 and/or 301, display generation component 114, and/or the one or more image sensors 214 and/or 314 previously described in FIGS. 2A-3D. As shown in FIG. 4A, the physical environment 422 of the electronic device 401 includes an annotatable object 402 (e.g., a journal, piece of paper, notepad, or the like), a writing apparatus 404 (e.g., pen, pencil, marker, or any other type of object that is capable of annotating the annotatable object 402), and optionally a television 406 that is currently playing media content at a volume level 410. As described herein, in some examples, the writing apparatus can be used to physically ink the annotatable object (e.g., graphite of a pencil on paper, ink of a pen/marker on a notepad, or the like). In some examples, text-based or image-based input commands can enable the user to not only control an electronic device, but also to keep a physical "written record" of all the settings of user interface element (e.g., on the annotatable object) that can be retained and transported by the user for future reference or use.

In FIG. 4A, the electronic device 401 has not yet detected/received a text-based or image-based input command because the writing apparatus 404 has not yet annotated the annotatable object 402 to include a text-based or image-based input command. In FIG. 4B, the writing apparatus 404 has annotated the annotatable object 402 to include a text-based or image-based input command corresponding to a request to adjust the volume level of television 406. Specifically, the text-based or image-based input command includes a slider track (represented with a dashed line). A '−' symbol and a '+' symbol indicate minimum and maximum ends of the slider control (e.g., areas closer to the '−' symbol corresponds to lower volume levels than areas closer to the '+' symbol). The text-based or image-based input command further includes a slider bar represented by a '|' symbol corresponds to the desired volume level of television 405 (e.g., a representing a slider-type functionality), and its relative placement along the slider track can represent the volume level between the maximum and minimum ends. In some examples, the user can adjust the volume by erasing the '|' symbol in a first location and redrawing the '|' symbol is a second, different location along the slider track. The text-based or image-based input command also includes the characters/words "TV Volume" to indicate the text-based input command is associated with modifying the volume of television 406 (e.g., a device/system in communication with and visible to electronic device 401). In some examples, before using the text-based or image-based input command to control device actions, the elements of the text-based or image-based input command (e.g., the recognition of a drawn slider, the maximum and minimum boundary locations, the corresponding functionality) can be confirmed as part of an enrollment process. In some examples, the user can be prompted with text and/or audio prompts to enter, clarify and/or confirm some or all of the information for enrollment prior to using the text-based on image-based input command for control. For example, a prompt can be issued for unentered aspects of the text-based or image-based command (e.g., instructing a user to add '+' and '−' symbols to indicate maximum and minimum points) or to clarify the semantic meaning of aspects of the text-based or image-based command (e.g., instructing the user to redraw the location of the '+' symbol when the system cannot differentiate the user's drawings of the '+' and '−' symbols).

After the writing apparatus 404 annotated the annotatable object 402 to include the text-based or image-based input command for controlling the volume of television 406 (e.g., in response to the annotation of the annotatable object), the electronic device 401 detects the text-based or image-based input command (e.g., via the one or more image sensors 414), and transmits a signal to television 406 to control and/or modify the volume level of television 406 to correspond to the volume level indicated by the '|' symbol in the text-based or image-based input command (as described previously). The television 406 receives the signal transmitted by the electronic device 401 and decreases the volume of television 406 from the volume level 420 illustrated in FIG. 4A to the volume level 432 illustrated in FIG. 4B (which corresponds to the volume level indicated by the '|' symbol in the text-based or image-based input command). It should be understood that the above-described example is one possible example of a text-based or image-based input command that can be detected by electronic device 401, but other text-based or image-based input commands may also be able to be detected by the electronic device 401 without departing from the scope of the disclosure. For example, the electronic device 401 is optionally configured to detect text-based or image-based input commands for modifying the lighting of a IoT-based lighting system that is communication with the electronic device 401 or for modifying a function of the electronic device 401, among other possibilities.

Figure 4B:
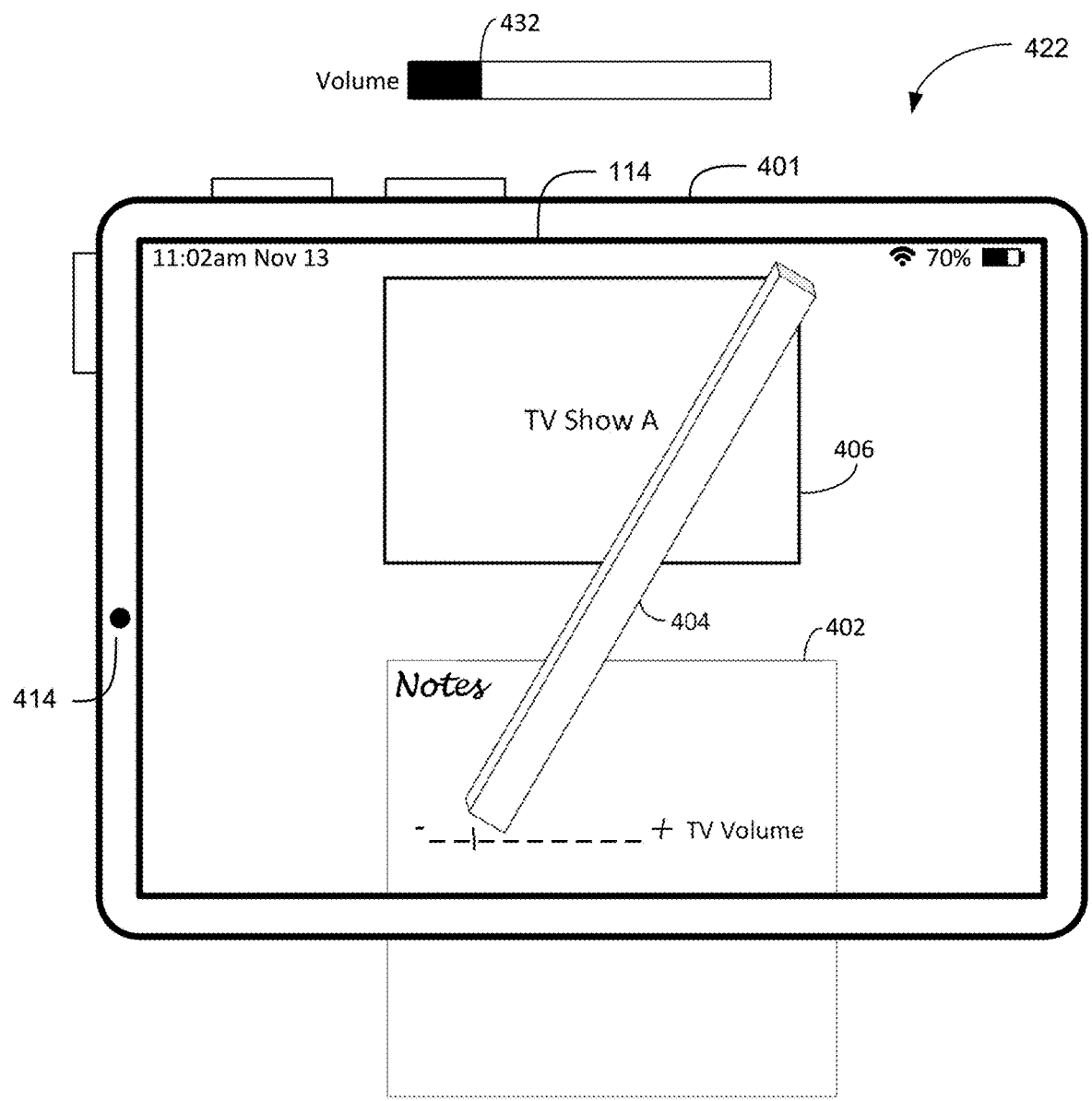

Although FIGS. 4A-4B primarily describe a text-based or image-based input command having a slider-type functionality (e.g., volume adjustment) defined using maximum and minimum boundaries, as described herein, other types of functionality can be implemented (e.g., a knob using a change in the drawn position of the knob's pointer to indicate rotation, a toggle switch, a non-linear slider, etc.). Additionally, although FIGS. 4A-4B illustrate a slider-type functionality including a slider track and slider bar, that other user interface implementations of a slider control can be implemented. For example, the control can be a rectangle with minimum and maximum represented at opposite ends of the rectangle and shading within the rectangle relative to the minimum end of the rectangle can represent the volume level.

Additionally, although FIGS. 4A-4B primarily describe a text-based or image-based input command in which the adjustment of the volume is achieved by the inked position of the '|' symbol in the text-based or image-based input command, it is understood that in some examples, the adjustment of the volume can instead be achieved using a virtual slider control. For example, in response to detecting a slider control as part of a text-based or image-based input command (e.g., a slider track and slider bar annotated on the annotatable object), the system can cause a virtual slider control to be presented. In some examples, the virtual slider control can include a virtual slider track and a virtual slider bar, which can occlude the inked slider control of the text-based or image-based input command. In some examples, while presenting the virtual slider control, the system can detect the use writing apparatus 404 to manipulate the position of the virtual slider bar by touching the top of writing apparatus 404 to the virtual slider bar and dragging the virtual slider bar using the writing apparatus 404 (where the touching and movement are detected using the image sensors of device 401, for example).

Figure 5A:
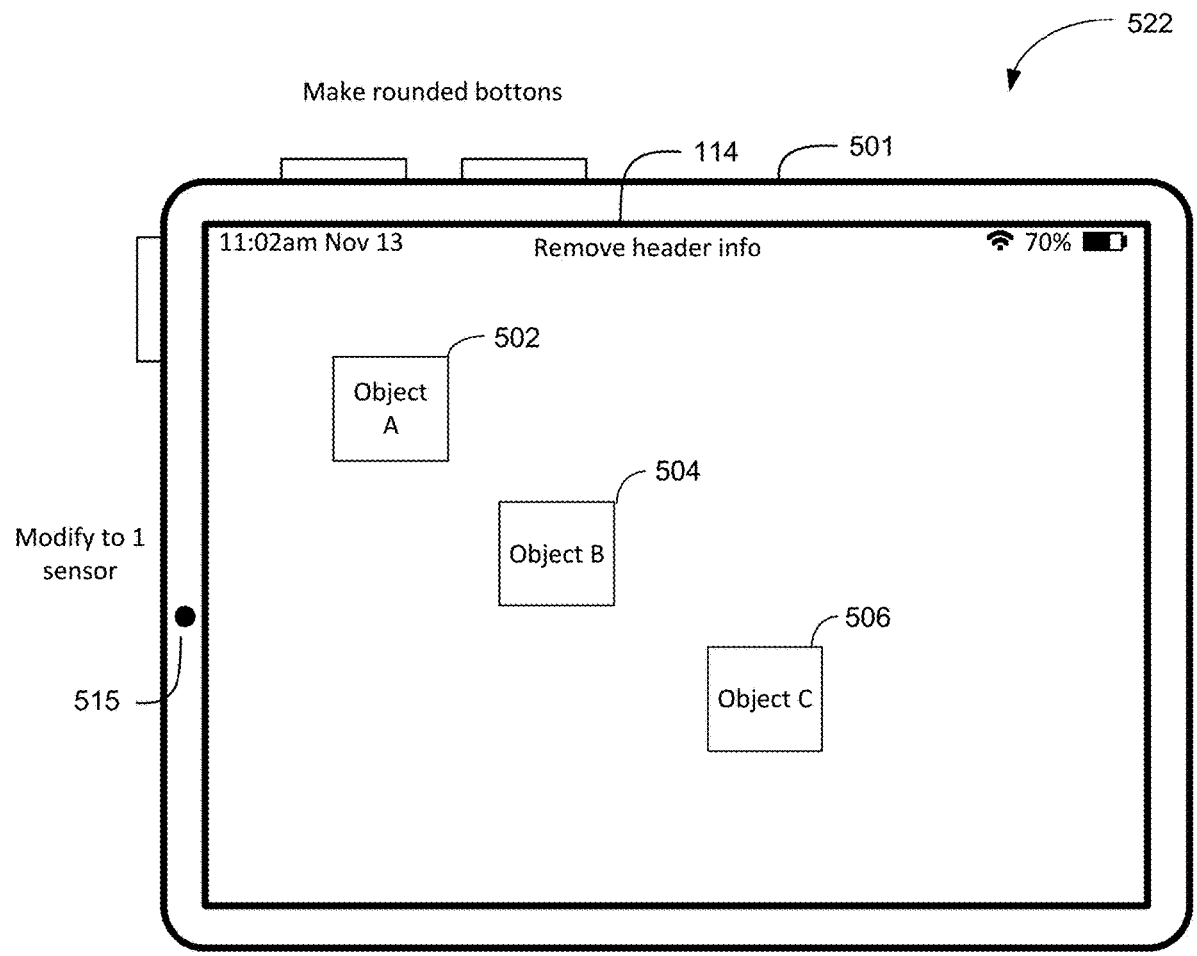
FIGS. 5A-5C illustrate examples of an electronic device detecting one or more physical objects in the physical environment to construct a musical sequence (e.g., a sequence of musical notes) in accordance with some examples of the disclosure.
Figure 5B:
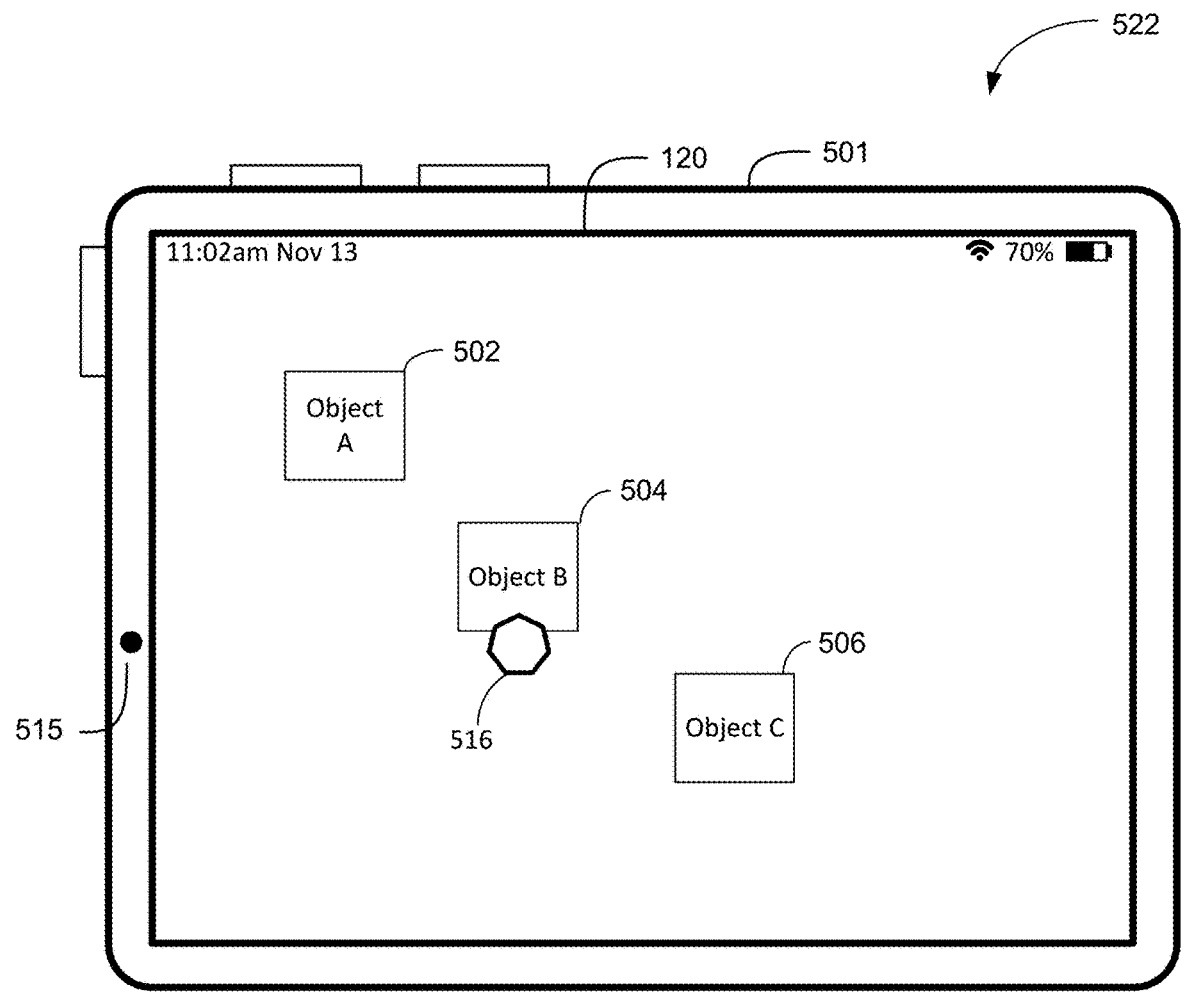
Figure 5B:
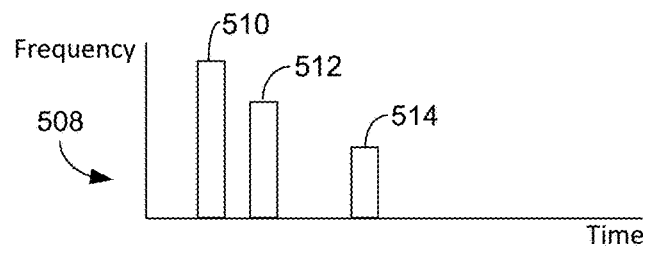
Figure 5C:
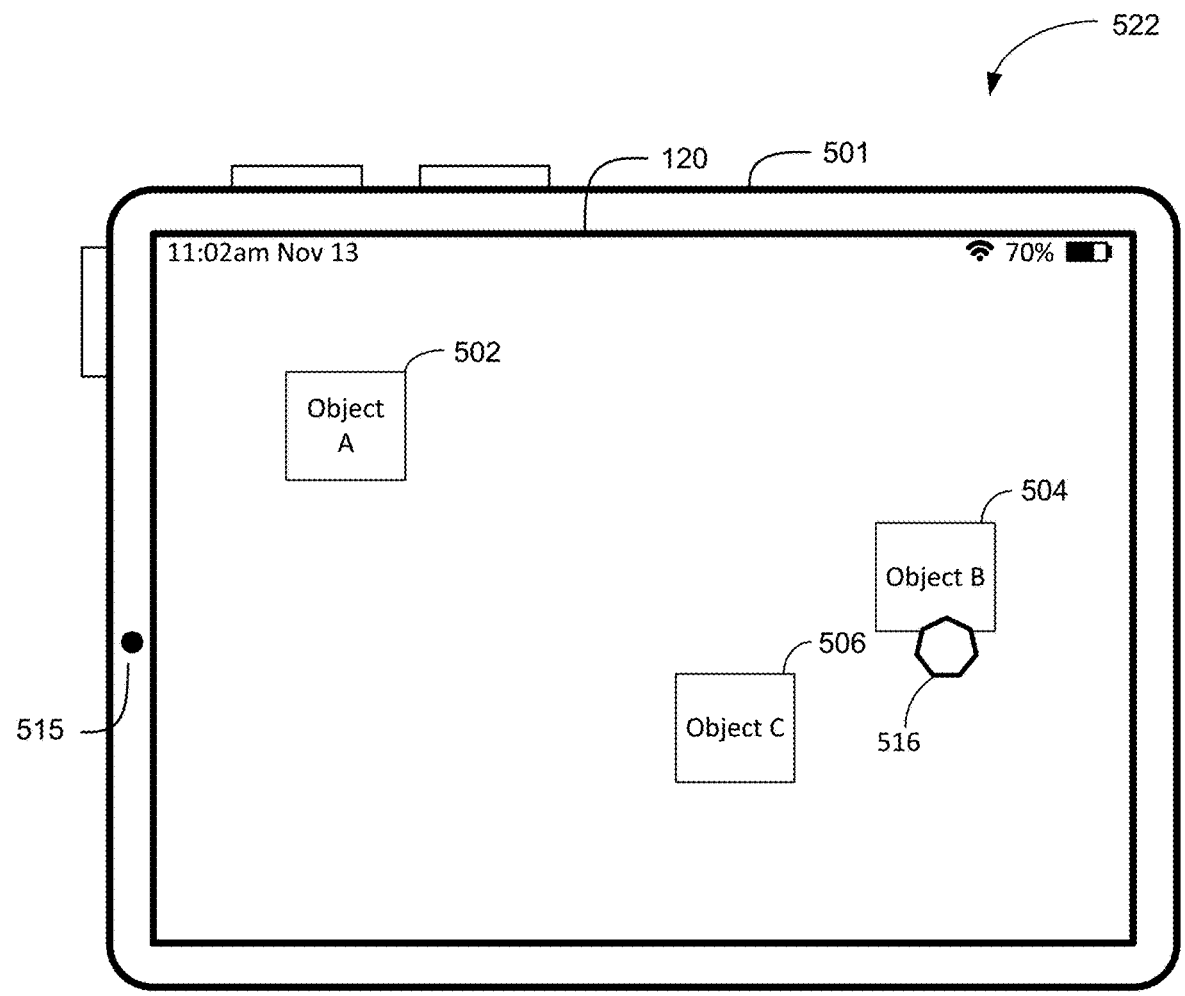
Figure 5C:
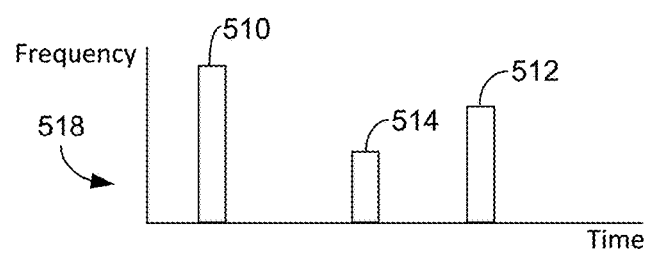

In some examples, an electronic device detects one or more physical objects in the physical environment to construct a musical sequence (e.g., a sequence of musical notes), as will now be described with reference to FIGS. 5A-5C. In some examples, the physical objects can be used to implement a Musical Instrument Digital Interface (MIDI). In FIG. 5A, the electronic device 501 is detecting, via the one or more image sensors 515 (e.g., the same as or similar to the one or more image sensors 414 in FIGS. 4A and 4B), three physical objects in the physical environment 522 of the electronic device 501: Object A 502, Object B 504, and Object C 506 (which are presented by the electronic device 501 via the transparent or translucent display generation component 114). In some examples, the one or more physical objects in the physical environment 522 corresponds to one or more musical notes. Although not described in the context of FIGS. 5A-5C, the objects are optionally first configured to represent musical notes and the surface on which the objects are placed is optionally first configured to represent boundaries for the timing and frequency of a MIDI interface (e.g., assigning timing on a first axis (e.g., x-axis) and frequency on a second axis (e.g., y-axis). For example, in FIG. 5A, in response to the electronic device 501 detecting Object A 502, Object B 504, and Object C 506, the electronic device 501 constructs/generates a musical sequence 508. As illustrated in FIG. 5A, the musical sequence 508 includes a first musical note 510 that corresponds to Object A 502, a second musical note 512 that corresponds to Object B 504, and a third musical note 514 that corresponds to Object C 506.

In some examples, the musical note that corresponds to a respective physical object in the physical environment 522 is based on one or more characteristics of that physical object. For example, the first musical note 510 is optionally different than the second musical note 512 and/or third musical note 514 because Object A 502—the physical object corresponding to the first musical note 510 is different than the Object B 504 and/or Object C 506 (the physical objects corresponding to the second musical note 512 and third musical note 514, respectively) (e.g., Object A 502 is a first type of physical object and Objects B 504 and/or C 506 are not of the first type).

In some examples, the musical note that corresponds to a respective physical object in the physical environment 522 is based on the visual appearance of that respective physical object and/or the symbol included at the respective physical object (in addition to or as an alternative to using the x-y location to determine frequency and timing of each note). For example, Object A 502 optionally corresponds to the first musical note 510 because the electronic device 501 determined that a first symbol is located at Object A 502 (e.g., includes a drawing of a first musical instrument or musical note) and/or because the electronic device determined that Object A 502 is a first color (e.g., yellow, red, blue, etc.). Similarly, Objects B 504 and C 506 optionally corresponds to the second musical note 512 and third musical note 514, respectively, for analogous reasons as described above. Thus, in some examples, the first musical note 510, second musical note 512, and third musical note 514 optionally correspond to different/distinct musical notes or the same musical note (e.g., depending on the position along the y-axis).

In some examples, the timing of a musical note in the musical sequence 508 is based on the location of the corresponding physical object in the physical environment 522 of the electronic device 501. For example, the musical note 510 optionally occurs before the musical note 512, and the musical note 512 occurs before the musical note 514 in the musical sequence 508 because the electronic device 501 detected that Object A 502 is before Object B 504 and Object B 504 is before Object C 506 in a left to right manner. It should be understood that if the electronic device 501 would have instead detected the physical objects in the physical environment in a right to left manner, the musical notes in the musical sequence 508 would have optionally been ordered with the third musical note 514 first, the second musical note 512 second, and the first musical note 510 third.

In some examples, the distance in time between musical notes in the musical sequence 508 is based on (e.g., corresponds to) the distance between the corresponding physical objects in the physical environment 522. For example, the musical note 512 optionally occurs 0.1, 0.5, 1, or 2 seconds after musical note 510 in the musical sequence 508 because the electronic device 501 has determined that Object B 504 is to the right of Object A 502 by 1, 2, 4, or 6 inches. Similarly, the time between musical note 512 and musical note 514 in the musical sequence 508 is optionally longer than the time between musical note 510 and 512 in the musical sequence 508 because the physical distance between Object A 502 and Object B 504 is less than the physical distance between Object B 504 and Object C 506 (as illustrated in FIG. 5A). In some examples, placing two (or more) objects at the same point along the time axis (e.g., the x-axis) can be used to implement a chord.

In some examples, in response to the electronic device 501 constructing the musical sequence 508, the electronic device 501 plays the musical sequence 508 or causes the musical sequence 508 to play at a second electronic device in communication with the electronic device 501 (e.g., a smart speaker, television, computer, or the like) plays the musical sequence 508.

In some examples, the electronic device 501 constructs a new musical sequence in response to detecting movement of physical objects in the physical environment 522 of the electronic device 501. For example, in FIG. 5B, the electronic device is detecting that the hand (e.g., represented by hexagon 516) of the user has grabbed/picked up Object B 504 in the physical environment 522. After the electronic device detected that hand (e.g., represented by hexagon 516) of the user grabbed/picked up Object B 504, in FIG. 5C, the electronic device 501 detects movement of Object B 504 from the location in the physical environment 522 indicated in FIG. 5B to the location in the physical environment 522 indicated in FIG. 5C. In response to the electronic device 501 detecting movement of Object B 504 in the physical environment 522, the electronic device 501 constructions a new musical sequence 518, different from the musical sequence 508 illustrated in FIG. 5A in analogous ways as previously described.

Figure 6:
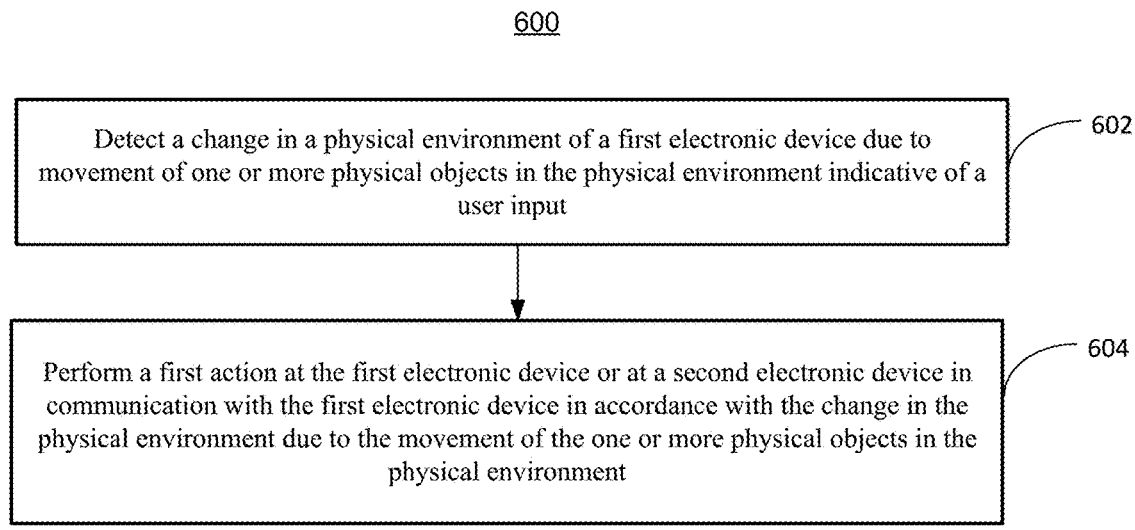
FIG. 6 illustrates process 600 for performing an action at a first electronic device or second electronic device in accordance with some examples of the disclosure.

FIG. 6 illustrates an example process 600 for performing an action at a first electronic device or second electronic device in accordance with some examples of the disclosure. Process 600 is optionally performed at an electronic device such as device 100, device 201, 301, 401, and/or 501. Some operations in process 600 are optionally combined and/or optionally omitted. The order of some operations in process 600 is optionally changed, in some examples.

In some examples, process 600 is performed at a first electronic device in communication with a display and one or more input devices. In some examples, the first electronic device detects (602) a change in a physical environment of the first electronic device due to a movement of one or more physical objects in the physical environment indicative of a user input. In some examples, the first electronic device performs (604) a first action at the first electronic device or at a second electronic device in communication with the first electronic device in accordance with the change in the physical environment due to the movement of the one or more physical objects in the physical environment.

In some examples, detecting the change in the physical environment of the first electronic device includes detecting movement of a first physical object of the one or more physical objects relative to a second physical object in the physical environment of the first electronic device, different from the one or more physical objects.

In some examples, before the first electronic device detected the change in the physical environment, the first physical object was less than a threshold distance from the second physical object. In some examples, after detecting the change in the physical environment that includes movement of the first object relative to the second object, in accordance with a determination that the first object is more than the threshold distance from the second object, the first electronic device performs the first action at the first electronic device or the second electronic device. In some examples, after detecting the change in the physical environment that includes movement of the first object relative to the second object, in accordance with a determination that the first object is not more than the threshold distance from the second object, the first electronic device forgoes performing the first action at the first electronic device or the second electronic device.

In some examples, after performing the first action at the first or the second electronic device and while the first physical object is more than the threshold distance from the second physical object, the first electronic device detects movement of the first physical object relative to the second physical object. In some examples, in response to detecting movement of the first physical object relative to the second physical object, in accordance with a determination that the first physical object is less than a threshold distance from the second physical object, the first electronic device performs a second action at the first electronic device or the second electronic device, different from the first action. In some examples, in response to detecting movement of the first physical object relative to the second physical object, in accordance with a determination that the first physical object more than a threshold distance from the second physical object, the first electronic device forgoes performing the second action at the first electronic device or the second electronic device.

In some examples, performing the first action includes toggling on a first function of the first or the second electronic device, and performing the second action includes toggling off the first function of the first or the second electronic device. In some examples, the one or more physical objects do not include electronic circuitry. In some examples, the change in the physical environment is captured via the one or more input devices of the first electronic device. In some examples, the one or more input devices include a camera that captures the movement of the one or more physical objects over a plurality of time periods.

In some examples, performing the first action includes displaying a user interface object at the first electronic device. In some examples, in response to selecting the user interface object at the first electronic device, the first electronic device performs a second action, different from the first action, at the first or the second electronic device in accordance with the selection of the user interface object at the first electronic device.

In some examples, before the first electronic device detected the change in the physical environment, the first physical object was a first distance from the second physical object. In some examples, after detecting the change in the physical environment that includes movement of the first object relative to the second object, in accordance with a determination that the first object is a second distance, different from the first distance, from the second physical object, the first electronic device performs the first action at the first or the second electronic device; and in accordance with a determination that the first object a third distance, different from the first distance, from the second physical object, the first electronic device performs a second action, different from the first action, at the first or the second electronic device.

In some examples, after performing the first action at the first or the second electronic device and while the first physical object is the second distance from the second physical object, the first electronic device detects movement of the first physical object relative to the second physical object. In some examples, in response to detecting movement of the first physical object relative to the second physical object: in accordance with a determination that the first object is a fourth distance, different from the second distance, from the second physical object, the first electronic device performs a third action at the first or the second electronic device; and in accordance with a determination that the first object a fifth distance, different from the second distance, from the second physical object, the first electronic device performs a fourth action, different from the third action, at the first or the second electronic device.

In some examples, performing the first action includes modifying a first function of the first or the second electronic device by a first amount, performing the second action includes modifying the first function of the first or the second electronic device by a second amount, different from the first amount, performing the third action includes modifying the first function of the first or the second electronic device by a third amount, different from the second amount, and performing the fourth action includes modifying the first function of the first or the second electronic device by a fourth amount, different from the third amount (e.g., adjusting volume or brightness level based on position of the first physical object acting as a slider).

In some examples, before detecting movement of the first physical object relative to the second physical object (e.g., before performing the first action in accordance with the change in the physical environment due to the movement of the one or more physical objects in the physical environment), the first electronic device receives, via the one or more input devices, an input for configuring the first action to be performed based on the one or more physical objects. In some examples, in response to receiving the input, the first electronic device initiates a process to configure the first action to be performed based on movement of the one or more physical objects.

In some examples, after detecting the change in the physical environment that includes movement of the one or more physical objects, in accordance with a determination that the first electronic device has not been configured to perform the first action responsive to movement of the one or more physical objects, the first electronic device forgoes performing the first action in response to detecting movement of the one or more physical objects.

In some examples, the input for configuring the first action to be performed based on the one or more physical objects includes a gaze of the user of the first electronic device directed to the one or more physical objects for a threshold amount of time. In some examples, the input for configuring the first action to be performed based on the one or more physical objects includes a voice command (e.g., audio input) directed to the one or more physical objects. In some examples, the input for configuring the first action to be performed based on the first and the second physical object includes a pre-determined gesture directed to one of the one or more physical objects.

In some examples, the one or more physical objects includes a plurality of physical objects and performing the first action includes constructing a sequence of musical notes in accordance a position of the plurality of physical objects, wherein a frequency of each of the musical notes is determined based on a corresponding position of one of the plurality of physical objects in the physical environment (e.g., in accordance with a determination that the first physical object is at a first position in the physical environment, constructing a first musical note; and in accordance with a determination that the first physical object is at a first position in the physical environment, constructing a second musical note, different from the first musical note).

In some examples, after constructing the sequence of musical notes, the first electronic device detects movement of one or more of the plurality of physical objects. In some examples, in response to detecting movement of one or more of the plurality of physical objects, the first electronic device constructs a different sequence of musical notes (e.g., based on the updated position of the plurality of physical objects).

In some examples, a timing of each of the musical notes is determined based on the corresponding position of one of the plurality of physical objects in the physical environment (e.g., based on the position of the plurality of objects along an axis representing time).

In some examples, the one or more physical objects includes a writing apparatus and/or an annotatable object. In some examples, the first electronic device detects (602) a change in a physical environment of the first electronic device due to a movement of one or more physical objects in the physical environment indicative of a user input (e.g., detecting, in a physical environment, a user interface element inked on a physical surface with one or more physical objects and detecting, in the physical environment, a change in an appearance of the user interface element due to a movement of the one or more physical objects indicative of a user input). In some examples, the first electronic device performs the first action at the first electronic device or at a second electronic device in communication with the first electronic device in accordance with the change in the physical environment due to the movement of the one or more physical objects in the physical environment (e.g., adjusting volume when the user draws a slider bar on the paper at a different location along the drawn slider user interface element).

It should be understood that the particular order of the description of the operations in FIG. 6 is merely exemplary and is not intended to indicate that the described order is the only order in which the operations could be performed. One of ordinary skill in the art would recognize various ways to reorder the operations described herein.

The operations of process described above are, optionally, implemented by an electronic device comprising: one or more processors; memory; and one or more programs stored in the memory. The one or more programs stored in the memory and configured to be executed by the one or more processors, cause the processor to perform any of the above operations. The operations of process described above are, optionally, implemented by a storing one or more programs. The one or more programs stored in the non-transitory computer readable storage medium and configured to be executed by the one or more processors of an electronic device, cause the processor to perform any of the above operations.

The operations of process described above are, optionally, implemented by running one or more functional modules in an information processing apparatus such as general-purpose processors (e.g., as described with respect to FIGS. 1A-1B) or application specific chips. Further, the operations described above with reference to FIG. 6 are, optionally, implemented by components depicted in FIGS. 1A-1B.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

The invention claimed is:

1. A method comprising:
   at a first electronic device in communication with a display and one or more input devices:
   detecting a change in a physical environment of the first electronic device due to a movement of one or more physical objects, different from a hand of a user and different from a writing implement, in the physical environment indicative of a user input including detecting movement of a first physical object, of the one or more physical objects relative to a second physical object, from a first location in the physical environment of the first electronic device to a second location in the physical environment, wherein the first physical object is less than a threshold distance from the second physical object before detecting the change in the physical environment;
   after detecting the change in the physical environment, in accordance with a determination that the first physical object is more than the threshold distance from the second physical object, performing a first action at the first electronic device or at a second electronic device in communication with the first electronic device in accordance with the change in the physical environment due to the movement of the one or more physical objects in the physical environment; and
   in accordance with a determination that the first physical object is not more than the threshold distance from the second physical object, forgoing performing the first action at the first electronic device or the second electronic device.

2. The method of claim 1, further comprising:
   after performing the first action at the first electronic device or the second electronic device and while the first physical object is more than the threshold distance from the second physical object, detecting movement of the first physical object relative to the second physical object; and
   in response to detecting movement of the first physical object relative to the second physical object:
   in accordance with a determination that the first physical object is less than the threshold distance from the second physical object, performing a second action at the first electronic device or the second electronic device, different from the first action; and
   in accordance with a determination that the first physical object more than the threshold distance from the second physical object, forgoing performing the second action at the first electronic device or the second electronic device.

3. The method of claim 2, wherein performing the first action includes toggling on a first function of the first electronic device or the second electronic device, and wherein performing the second action includes toggling off the first function of the first electronic device or the second electronic device.

4. A first electronic device, comprising:
   one or more input devices, including a first input device configured to detect a gaze of a user of the first electronic device;
   a display; and
   one or more processors configured to perform a method comprising:
   detecting a change in a physical environment of the first electronic device due to a movement of one or more physical objects, different from a hand of the user, in the physical environment indicative of a user input;
   performing a first action at the first electronic device or at a second electronic device in communication with the first electronic device in accordance with the change in the physical environment due to the movement of the one or more physical objects, in relation to a second physical object, different from the one or more physical objects, in the physical environment; and
   before performing the first action in accordance with the change in the physical environment due to the movement of the one or more physical objects in the physical environment, receiving, via the one or more input devices, an input for configuring the first action to be performed based on the one or more physical objects; and
   in response to receiving the input:
   initiating a process to configure the first action to be performed based on movement of the one or more physical objects,
   wherein the input for configuring the first action to be performed based on the one or more physical objects includes the gaze of a user of the first electronic device directed to the one or more physical objects for a threshold amount of time.

5. The first electronic device of claim 4, wherein the one or more physical objects do not include electronic circuitry.

6. The first electronic device of claim 4, wherein the change in the physical environment is captured via the one or more input devices of the first electronic device.

7. The first electronic device of claim 4, wherein the method comprises:
   after detecting the change in the physical environment that includes movement of the one or more physical objects:
   in accordance with a determination that the first electronic device has not been configured to perform the first action responsive to movement of the one or more physical objects, forgoing performing the first action in response to detecting movement of the one or more physical objects.

8. The first electronic device of claim 4, wherein the one or more physical objects includes a plurality of physical objects, and wherein performing the first action includes:
constructing a sequence of musical notes in accordance a position of the plurality of physical objects, wherein a frequency of each of the musical notes is determined based on a corresponding position of one of the plurality of physical objects in the physical environment.

9. The first electronic device of claim 8, wherein the method comprises:
after constructing the sequence of musical notes, detecting movement of one or more of the plurality of physical objects; and
in response to detecting movement of the one or more of the plurality of physical objects, constructing a different sequence of musical notes.

10. The first electronic device of claim 8, wherein a timing of each of the musical notes is determined based on the corresponding position of one of the plurality of physical objects in the physical environment.

* * * * *